(12) United States Patent
Emmanuel et al.

(10) Patent No.: US 10,565,841 B2
(45) Date of Patent: Feb. 18, 2020

(54) CONTROLLING CHANNEL USAGE IN A WIRELESS NETWORK

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 19 days.

(21) Appl. No.: 15/643,292

(22) Filed: Jul. 6, 2017

(65) Prior Publication Data

US 2018/0103404 A1 Apr. 12, 2018

Related U.S. Application Data

(60) Provisional application No. 62/406,325, filed on Oct. 10, 2016.

(51) Int. Cl.
*G08B 13/22* (2006.01)
*H04W 4/02* (2018.01)
(Continued)

(52) U.S. Cl.
CPC ............ *G08B 13/22* (2013.01); *G01S 5/0289* (2013.01); *G01S 5/0294* (2013.01); *G01S 19/46* (2013.01);
(Continued)

(58) Field of Classification Search
CPC . H04W 84/12; H04W 72/082; H04W 84/045; H04W 16/26; H04W 4/80; H04W 4/70; H04W 76/11; H04W 12/00; H04W 12/08; H04W 28/0289; H04W 28/04; H04W 36/20; H04W 36/245; H04W 40/246; H04W 4/02; H04W 4/029; H04W 4/04; H04W 4/30; H04W 80/06; H04W 84/105; H04W 84/18; H04W 76/15; H04W 72/0453; H04W 72/1231; H04W 28/0236; H04W 28/18; H04W 36/32; H04W 36/38; H04L 41/12; H04L 43/0888; H04L 43/16; H04L 12/4633; H04L 43/08;
(Continued)

(56) References Cited

U.S. PATENT DOCUMENTS 7,248,574 B2 7/2007 Backes et al.
9,554,061 B1 * 1/2017 Proctor, Jr. ............ H04N 5/268
(Continued)

FOREIGN PATENT DOCUMENTS

WO WO-2015042967 A1 * 4/2015 ............ H04W 36/06
WO 2016064641 A1 4/2016

*Primary Examiner* — Rownak Islam
(74) *Attorney, Agent, or Firm* — Perkins Coie LLP

(57) ABSTRACT

Methods, apparatuses, and embodiments related to a technique for controlling channel usage in a wireless network in a multi-band wireless networking system. In a wireless network with multiple wireless networking devices and one or more client devices, communications between the wireless networking devices occurs via a backhaul channel, and communication between the client(s) and the wireless networking devices occurs via a fronthaul channel. Based on interference characteristics of the wireless channels, a device determines a channel usage plan, and communicates the plan via the backhaul channel to the wireless networking devices of the wireless network.

22 Claims, 27 Drawing Sheets

(51) Int. Cl.
| | |
|---|---|
| H04W 4/029 | (2018.01) |
| H04W 76/11 | (2018.01) |
| H04W 16/26 | (2009.01) |
| G08B 13/24 | (2006.01) |
| H04L 12/26 | (2006.01) |
| H04L 12/24 | (2006.01) |
| H04W 12/08 | (2009.01) |
| H04B 17/318 | (2015.01) |
| H04L 29/06 | (2006.01) |
| H04W 28/02 | (2009.01) |
| H04W 72/04 | (2009.01) |
| H04W 84/12 | (2009.01) |
| H04L 29/08 | (2006.01) |
| H04W 36/24 | (2009.01) |
| H04W 36/32 | (2009.01) |
| H04W 36/38 | (2009.01) |
| H04W 4/70 | (2018.01) |
| H04W 4/80 | (2018.01) |
| H04L 12/46 | (2006.01) |
| H04B 1/00 | (2006.01) |
| H04B 1/713 | (2011.01) |
| H04L 5/00 | (2006.01) |
| H04W 80/06 | (2009.01) |
| H04W 84/04 | (2009.01) |
| H04W 84/10 | (2009.01) |
| H04B 17/345 | (2015.01) |
| H04B 17/00 | (2015.01) |
| G01S 5/02 | (2010.01) |
| G01S 19/46 | (2010.01) |
| H04W 4/04 | (2009.01) |
| H04W 36/20 | (2009.01) |
| H04W 72/08 | (2009.01) |
| H04W 28/04 | (2009.01) |
| H04W 4/30 | (2018.01) |
| H04W 12/00 | (2009.01) |
| H04W 84/18 | (2009.01) |
| H04W 48/02 | (2009.01) |
| H04W 76/15 | (2018.01) |
| H04L 12/751 | (2013.01) |
| H04W 88/08 | (2009.01) |
| H04W 88/10 | (2009.01) |
| H04W 92/20 | (2009.01) |
| H04B 1/715 | (2011.01) |
| H04W 40/24 | (2009.01) |
| H04W 8/00 | (2009.01) |
| H04W 28/18 | (2009.01) |
| H04W 72/12 | (2009.01) |

(52) U.S. Cl.
CPC ......... *G08B 13/2494* (2013.01); *H04B 1/005* (2013.01); *H04B 1/713* (2013.01); *H04B 17/0085* (2013.01); *H04B 17/318* (2015.01); *H04B 17/345* (2015.01); *H04L 5/003* (2013.01); *H04L 12/4633* (2013.01); *H04L 41/12* (2013.01); *H04L 43/08* (2013.01); *H04L 43/0864* (2013.01); *H04L 43/0888* (2013.01); *H04L 43/16* (2013.01); *H04L 67/303* (2013.01); *H04L 67/42* (2013.01); *H04L 69/22* (2013.01); *H04W 4/02* (2013.01); *H04W 4/029* (2018.02); *H04W 4/04* (2013.01); *H04W 4/30* (2018.02); *H04W 4/70* (2018.02); *H04W 4/80* (2018.02); *H04W 12/00* (2013.01); *H04W 12/08* (2013.01); *H04W 16/26* (2013.01); *H04W 28/0236* (2013.01); *H04W 28/0289* (2013.01); *H04W 28/04* (2013.01); *H04W 36/20* (2013.01); *H04W 36/245* (2013.01); *H04W 36/32* (2013.01); *H04W 36/38* (2013.01); *H04W 72/0453* (2013.01); *H04W 72/082* (2013.01); *H04W 76/11* (2018.02); *H04W 80/06* (2013.01); *H04W 84/045* (2013.01); *H04W 84/105* (2013.01); *H04W 84/12* (2013.01); *H04B 2001/7154* (2013.01); *H04L 45/02* (2013.01); *H04W 8/005* (2013.01); *H04W 28/18* (2013.01); *H04W 40/246* (2013.01); *H04W 48/02* (2013.01); *H04W 72/1231* (2013.01); *H04W 76/15* (2018.02); *H04W 84/18* (2013.01); *H04W 88/08* (2013.01); *H04W 88/10* (2013.01); *H04W 92/20* (2013.01)

(58) Field of Classification Search
CPC ... H04L 43/0864; H04L 67/303; H04L 67/42; H04L 5/003; H04L 69/22; H04B 17/345; H04B 1/005; H04B 17/0085; H04B 17/318; H04B 1/713; G01S 19/46; G01S 5/0289; G01S 5/0294; G08B 13/22; G08B 13/2494
USPC .......................................................... 370/329
See application file for complete search history.

(56) References Cited

U.S. PATENT DOCUMENTS

| | | | |
|---|---|---|---|
| 9,990,822 | B2 | 6/2018 | Emmanuel et al. |
| 2007/0142050 | A1 | 6/2007 | Handforth et al. |
| 2010/0267414 | A1 | 10/2010 | Backes et al. |
| 2013/0308470 | A1 | 11/2013 | Bevan et al. |
| 2014/0098682 | A1 | 4/2014 | Cao et al. |
| 2014/0105135 | A1* | 4/2014 | Tellado ................ H04L 5/0037 370/329 |
| 2014/0269526 | A1 | 9/2014 | Mitola et al. |
| 2015/0004974 | A1 | 1/2015 | Karimi-Cherkandi et al. |
| 2015/0038140 | A1 | 2/2015 | Kilpatrick et al. |
| 2015/0071163 | A1 | 3/2015 | Mackie |
| 2015/0133124 | A1 | 5/2015 | Lim et al. |
| 2015/0195776 | A1 | 7/2015 | Padden et al. |
| 2015/0244580 | A1* | 8/2015 | Saavedra ........... H04L 41/0816 709/221 |
| 2015/0350228 | A1 | 12/2015 | Baxley et al. |
| 2016/0135204 | A1 | 5/2016 | Mishra et al. |
| 2016/0242183 | A1* | 8/2016 | Kang ................ H04W 72/1215 |
| 2016/0345192 | A1* | 11/2016 | Garg .................... H04W 24/04 |
| 2016/0353351 | A1 | 12/2016 | Huber et al. |
| 2017/0094681 | A1 | 3/2017 | Takeda et al. |
| 2017/0164323 | A1 | 6/2017 | Markhovsky et al. |
| 2017/0164375 | A1* | 6/2017 | Sundararajan .... H04W 72/1231 |
| 2017/0195006 | A1 | 7/2017 | Krasner et al. |
| 2017/0347269 | A1* | 11/2017 | Wu ...................... H04W 16/14 |
| 2018/0062723 | A1* | 3/2018 | Wilhelmsson ....... H04B 7/0452 |
| 2018/0324607 | A1* | 11/2018 | Rengarajan ........... H04W 24/02 |

* cited by examiner

CONTROLLING CHANNEL USAGE IN A WIRELESS NETWORK

CROSS-REFERENCE TO RELATED APPLICATIONS

This is a non-provisional application filed under 37 C.F.R. § 1.53(b), claiming priority under U.S.C. Section 119(e) to U.S. Provisional Patent Application Ser. No. 62/406,325 filed Oct. 10, 2016, the entire disclosure of which is hereby expressly incorporated by reference in its entirety.

BACKGROUND

With the evolving technologies of wireless networks, embedded systems, the Internet, etc., there is an ever increasing demand for increased network coverage, increased network bandwidth, higher network speed, etc. from all kinds of electronic devices employed in various settings, from computing and managing data to online shopping and social networking. This is particularly relevant with electronic and digital content having become extensively used in shared, networked environments as compared to traditional stand-alone personal computers and mobile devices. As a result, data traffic, and especially wireless data traffic (e.g., 2.4 GHz, 3.6 GHz, 5 GHz, 60 GHz, etc.), has experienced an enormous growth, with a corresponding increase in wireless traffic collisions, such as when multiple devices broadcast on the same wireless channel.

To achieve coverage in areas too large to cover with a Wi-Fi access point, a device such as a Wi-Fi repeater, extender, booster, etc. can be used to extend the area of coverage. A device such as a repeater enables the area of coverage to be extended. For example, the repeater can be located a distance from the access point, but still close enough to adequately receive Wi-Fi communications from the access point. The repeater can receive communications from the access point and relay those communications to a nearby client in an area not adequately covered by the access point, enabling clients in areas with inadequate coverage from the access point to receive communications from the repeater.

SUMMARY

Introduced here is a technique for controlling channel usage for a wireless network in a multi-band (e.g., Tri-band) wireless networking system. In some embodiments, the multi-band wireless networking system includes multiple wireless networking devices. In some embodiments, at least one of the wireless networking devices is connected to a wired network, such as a wired network with access to the Internet, and serves as a router. The remaining wireless networking device(s) serve as satellite(s) that are wirelessly connected to the router via a primary wireless channel or band (referred to herein as a "backhaul channel"), the backhaul channel being used primarily for communications between the wireless networking devices. Both the router and the satellites provide wireless network connections (e.g., WiFi connections) to client devices, such as desktop computers, laptop computers, tablet computers, mobile phones, wearable smart devices, game consoles, smart home devices, etc. The router can be any device that is capable of forwarding data between communication networks, such as a layer 2 bridge device or a layer 3 gateway device, among others.

In some embodiments, at boot up a router configures the wireless network and begins communicating with a satellite via a first channel, which is a backhaul channel. The satellite begins communicating with a client via a second channel, which is a fronthaul channel. The backhaul channel of this example is capable of higher bandwidth communication than the fronthaul channel. As the various devices are communicating, the wireless communication channels experience interference. The router and the satellite each scan the various wireless communication channels and characterize the observed interference characteristics. The router determines from the interference characteristics of the first channel that a wireless networking device of another network is broadcasting on the first channel, while the satellite observes a clear channel on the first channel. The difference in observations is due in part to the different location of the router and the satellite, with each device experiencing different interference characteristics as a result. The satellite determines from the interference characteristics of the second channel that a baby monitor is broadcasting on the second channel, while the router observes a clear channel on the second channel. Both the router and the satellite observe clear channels on third and fourth channels.

The router and the satellite exchange information regarding the observed interference via the backhaul channel, whereby the router learns that the satellite observed interference on the second channel, the satellite learns that the router observed interference on the first channel, and both the router and the satellite learn that the other device found a clear channel on the third and fourth channels. The router and the satellite communicate via the backhaul channel to determine a channel usage plan, and the router changes from the first channel to the third channel to take advantage of the clear third channel, and the satellite changes from the second channel to the fourth channel to take advantage of the clear fourth channel. As a result of moving to clear channels, and by coordinating usage of those channels, the communication bandwidth of the router and the satellite increases significantly.

Other aspects of the disclosed embodiments will be apparent from the accompanying figures and detailed description.

This Summary is provided to introduce a selection of concepts in a simplified form that are further explained in the Detailed Description. This Summary is not intended to identify key features or essential features of the claimed subject matter, nor is it intended to be used to limit the scope of the claimed subject matter.

DETAILED DESCRIPTION

Figure 1:
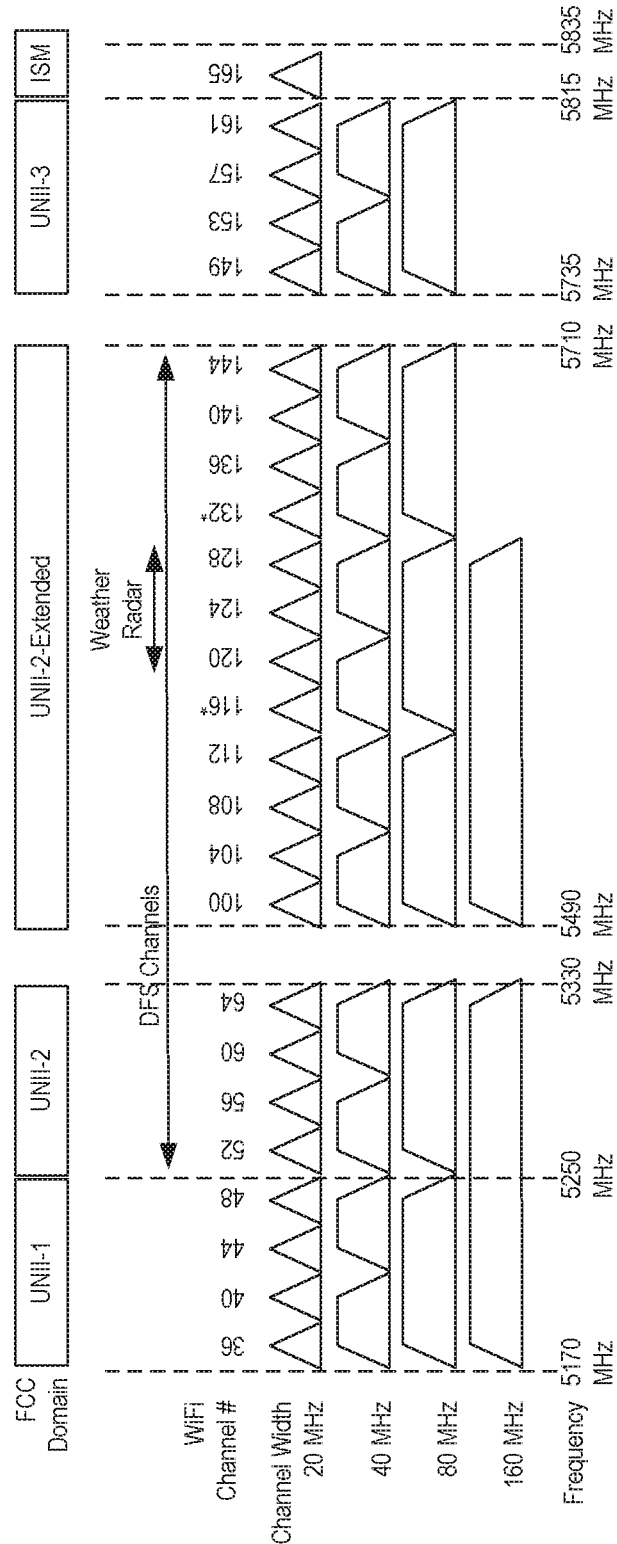
FIG. 1 shows 5 GHz channel allocation in North America, consistent with various embodiments.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof. References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

As used herein, unless specifically stated otherwise, the term "or" can encompass all possible combinations, except where infeasible. For example, if it is stated that data can include A or B, then, unless specifically stated otherwise or infeasible, the data can include A, or B, or A and B. As a second example, if it is stated that data can include A, B, or C, then, unless specifically stated otherwise or infeasible, the data can include A, or B, or C, or A and B, or A and C, or B and C, or A and B and C.

Multi-Band Wireless Networking System

The multi-band wireless networking system (also referred to herein as simply "system"). Each of the wireless networking devices (also referred to herein as simply "device" or "unit") of the system has multiple (e.g., three) wireless radio components for wireless communications over multiple (e.g., three) wireless bands. The system can dynamically and automatically select a channel at which the system is wirelessly connected to the client devices (also referred to herein as simply "clients"). A wireless networking device is a device that facilitates communication between clients, and between clients and a wired network, such as the Internet. In some embodiments, while one wireless networking device acts as an access point, which is a device that enables a client to connect to a wired network, each wireless networking device is capable of being configured to be an access point. In some embodiments, each client device can be wirelessly connected to the system at a different wireless channel. In some embodiments, the wireless networking system implements and wirelessly communicates via the Institute of Electrical and Electronic Engineers (IEEE) 802.11 WLAN standard (e.g., Wi-Fi).

In some embodiments, at least one of the wireless networking devices is connected to the Internet and serves as a router (also referred to as "base" or an "Access Point"). The remaining wireless networking device(s) serve as satellite(s) that are wirelessly connected to the router via a dedicated or primary wireless channel or band. One example of the multi-band wireless networking system is the NETGEAR® Orbi® system.

Channel Planning

In some embodiments, the system can conduct an initial channel selection when the system turns on. Then the system conducts a channel change based on a schedule. If there is a need for immediate channel change (e.g., sudden interference on a specific channel), the system can conduct a real-time channel change as well.

In some embodiments, at boot up a router configures the wireless network and begins communicating with a satellite via a first channel, which is a backhaul channel. The satellite begins communicating with a client via a second channel, which is a fronthaul channel. The backhaul channel of this example is capable of higher bandwidth communication than the fronthaul channel. A backhaul channel can comprise one or more channels of a wireless band, such as a 5 GHz high band channel, 60 Ghz channel, or a millimeter wave channel, and a fronthaul channel can comprise one or more channels of another band or bands, such as 5 Ghz low band or 2.4 Ghz band. As the various devices are communicating, the wireless communication channels experience interference. The router and the satellite each scan the various wireless communication channels and characterize the observed interference characteristics. The router determines from the interference characteristics of the first channel that a wireless networking device of another network is broadcasting on the first channel, while the satellite observes a clear channel on the first channel. The difference in observations is due in part to the different location of the router and the satellite, with each device experiencing different interference characteristics as a result. The satellite determines from the interference characteristics of the second channel that a baby monitor is broadcasting on the second channel, while the router observes a clear channel on the second channel. Both the router and the satellite observe clear channels on third and fourth channels.

The router and the satellite exchange information regarding the observed interference via the backhaul channel, whereby the router learns that the satellite observed interference on the second channel, the satellite learns that the router observed interference on the first channel, and both the router and the satellite learn that the other device found a clear channel on the third and fourth channels. The router and the satellite communicate via the backhaul channel to determine a channel usage plan, and the router changes from the first channel to the third channel to take advantage of the clear third channel, and the satellite changes from the second channel to the fourth channel to take advantage of the clear fourth channel. As a result of moving to clear channels, and by coordinating usage of those channels, the communication bandwidth of the router and the satellite increases significantly.

In some embodiments, the wireless networking devices of the system include radio components for three wireless bands, such as 2.4 GHz band, 5 GHz low band, and 5 GHz high band. One of the bands can be dedicated to or used primarily for wireless communications among the wireless networking devices of the system. The wireless communications among the wireless networking devices of the system is called backhaul communications. The other two bands can be used for wireless communications between the wireless networking devices of the system and client devices. The wireless communications between the wireless networking devices of the system and client devices are called fronthaul communications.

In some embodiments, the system uses the 5 GHz high band for backhaul communications by default, and uses the 2.4 GHz band and 5 GHz low band for fronthaul communications. For example, when the 2.4 GHz band is used for fronthaul communications, each unit of the system can operate on a different channel in the 2.4 GHz band. (A band can include multiple channels.) The decision for a best channel for each unit can be made based on various factors, such as network topology, number of interfering access points (also referred to herein as "APs") on each channel for each unit, noise on each channel for each unit, interference duration as percentage of time for each unit, type of network traffic supported for each unit, interference characteristics of one or more channels, a categorization of the interference characteristics of one or more channels, etc.

If the backhaul channel (e.g., one or more channels in the 5 GHz high band) goes down, the 2.4 GHz band can be used for backhaul communications among units of the system. For example, if a unit operating in satellite mode detects that the backhaul channel in the 5 GHz high band is no longer available (e.g., due to strong interference), the unit's 2.4 GHz radio component can switch to a scan mode to look for an uplink connection at one of the 2.4 GHz channel with another unit operating in router mode.

If there are multiple clean channels available for a unit, the unit can pick a clean channel that interferes less with other units that are in a vicinity. A client channel can be defined based on a function of interference, number of APs, and/or other parameters. If the function of the interference for a channel is less than a threshold, the channel is a clean channel. There are various ways to detect units in a vicinity. For example, networking topology among the units can be used to detect units in a vicinity. Beacon power from other units can be used to detect units in a vicinity. In some embodiments, a unit can use a combination of networking topology and beacon power to detect other units of the system in a vicinity.

The units can communicate the fronthaul channel selections with other units through the backhaul channel. In some embodiments, units having higher-priority network traffic can have a higher priority in picking the fronthaul channel over other units.

The system can make decisions regarding fronthaul channel selections in either a centralized way or a distributed way. In a distributed way, each unit can make decision on channel selection for itself. For example, in some embodiments, a base unit can pick a fronthaul channel first. Then each satellite unit can pick a fronthaul channel after the base unit establishes a backhaul link with the base unit. The system can optimize the channel selection based on some regular, random, semi-random, etc. schedule. In some embodiments, units handling higher-priority network traffic can have a higher priority in picking the fronthaul channel over other units during system boot-up or during scheduled channel optimization.

In a centralized way in some embodiments, the base unit makes decisions of channel selections for all units of the system. Each satellite unit can establish a dedicated backhaul link with the base unit and scan the channels in the fronthaul band(s). Each satellite unit sends detailed information regarding candidates of fronthaul channels to the base unit. The detailed information can include, e.g., scan results on all channels in the fronthaul band(s), and interference on all channels in the fronthaul band(s). The base unit can make the centralized decision on channel selection periodically over time.

Figure 2:
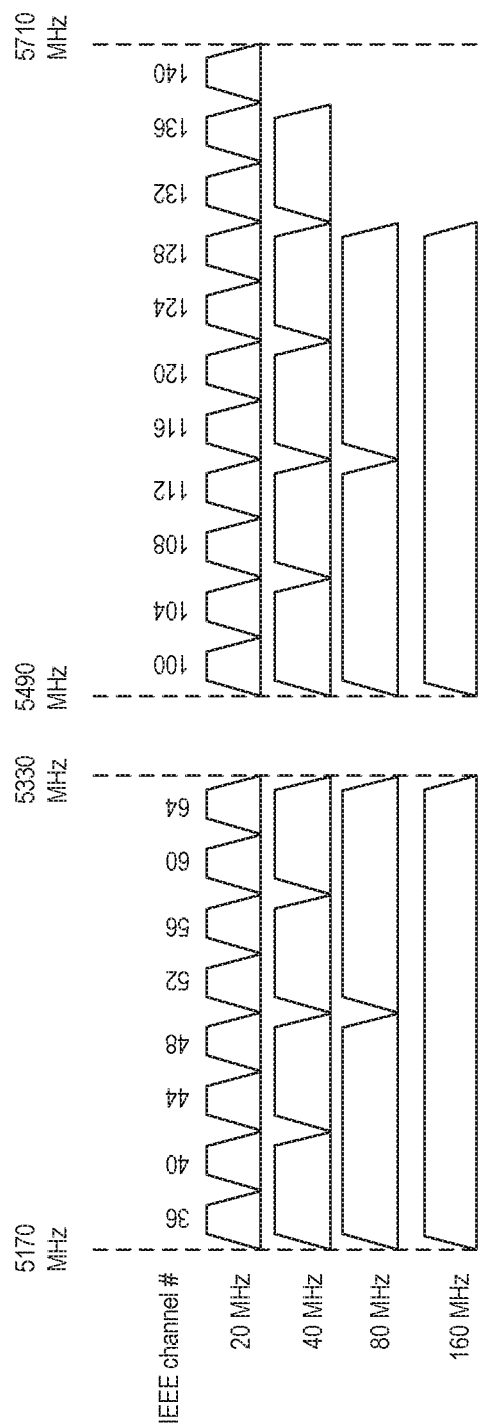
FIG. 2 shows 5 GHz channel allocation in Europe, consistent with various embodiments.

The units of the system can also use 5 GHz channels for fronthaul communications. FIGS. 1 and 2 show 5 GHz channel allocation in North America and Europe. Some of the 5 GHz channels require a mechanism of dynamic frequency selection (DFS) to allow devices to share the channels (called DFS channels). For example, devices are required to have DFS capabilities for channels allocated to radar systems so that those devices do not cause interference to radars.

If a unit of the system does not have DFS capability to avoid radar interference, the unit may be limited to pick non-DFS 5 GHz channels, such as channels #36, 40, 44, 48, as primary 80 MHz channel on UNII-1. The unit can keep 80 MHz bandwidth and change the primary channel, if the system has more control frames than data frames and mostly one AP is active. Alternatively, the unit can reduce the bandwidth to accommodate channel planning in some use cases such as business use or busy home use. For example, depending on a total number of units of the system, the unit can reduce bandwidth to 40 MHz or 20 MHz.

If a unit of the system does have DFS capability, the unit can pick a DFS channel that is clear for usage for fronthaul communications. The units of the system can use different 80 MHz channels for fronthaul communications, since there are multiple 80 MHz channels available as illustrated in FIG. 1.

Similar to the 2.4 GHz case, the system can conduct the 5 GHz channel selection either in a centralized way or a distributed way. The channel selection can use different channel/bandwidth combinations. For example, a unit can choose among two 80 MHz channels, or four 40 MHz channels, or eight 20 MHz channels, or a combination of one 80 MHz channel and two 40 MHz channels, or a combination of one 80 MHz channel, one 40 MHz channel and two 20 MHz channels, etc. The bandwidth selection can be conducted depending on use case and amount of load. For example, if one unit (AP) has many clients and lots of traffic, the unit can receive more channels.

If the system uses the 5 GHz high band for backhaul communications, there is only one 80 MHz channel available in North American as illustrated in FIG. 1. The system can decide to reduce the bandwidth, thus increasing the number of available channels. For example, if part of the 80 MHz backhaul channel is very busy, the system can reduce the bandwidth to 40 MHz or 20 MHz. The system can make the decision for backhaul in a centralized manner. In other words, all units can conduct channel scanning and send detailed information regarding the channels to the base unit. The base unit makes the decision for backhaul and broadcast backhaul channel information to the satellite units.

If DFS channels are available for backhaul communications, the system can use those DFS channels. For example, there can be two 80 MHz DFS channels in North America as illustrated in FIG. 1. For Europe, all 5 GHz channels are DFS channels. The system can pick best DFS channel based on DFS channel availability and channel utilization parameters as well as power levels.

Figure 25:
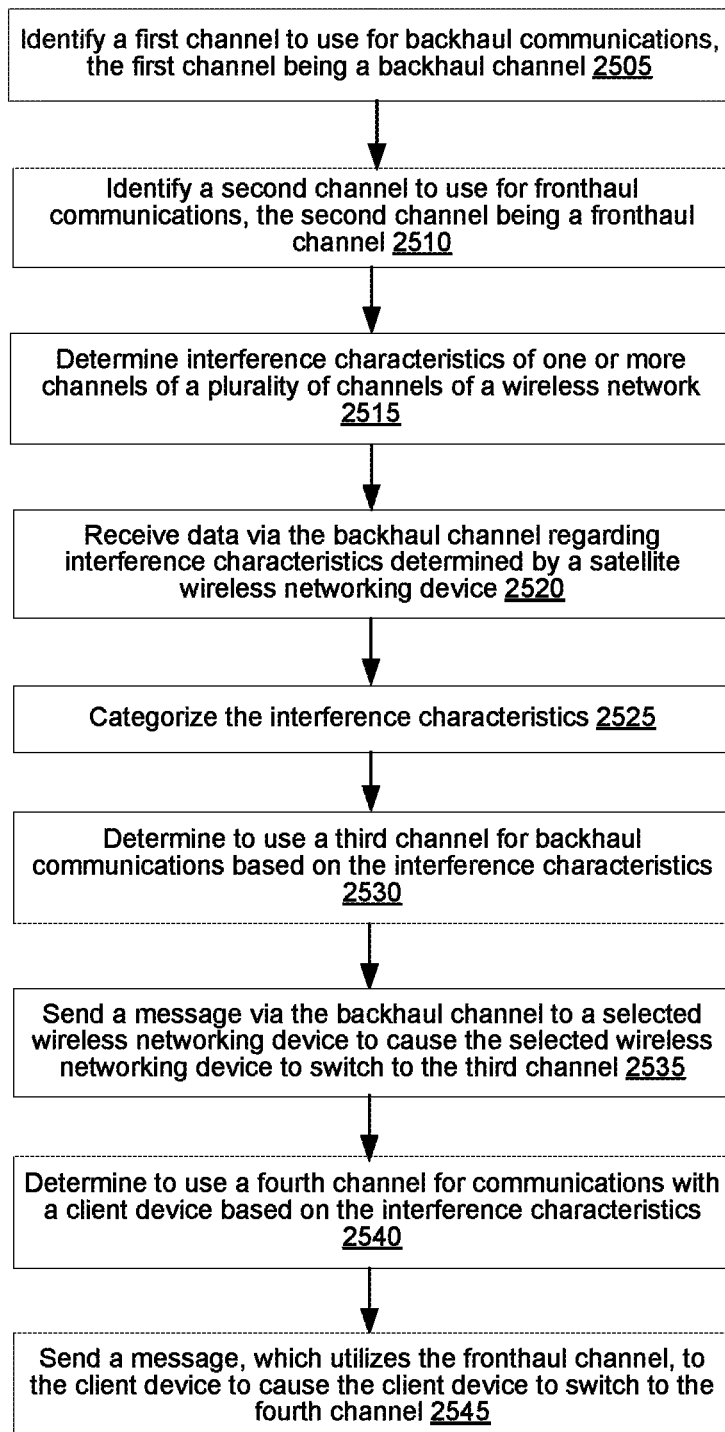
FIG. 25 illustrates a method for controlling channel usage of a Wi-Fi network, consistent with various embodiments.

FIG. 25 illustrates a method for controlling channel usage of a Wi-Fi network. At block 2505, a wireless networking device identifies a first wireless communication channel to use for backhaul communications, the first channel being a backhaul channel. Further, more than one channel can be used for backhaul communications. For example, a first backhaul channel can be used for communications between a router and a first satellite, a second backhaul channel can be used for communications between the router and a second satellite, and a third backhaul channel can be used for communications between the first and second satellites.

The wireless networking device can be a router or a satellite, and the wireless network includes a router and can include one or more satellites. The wireless networking device can select the initial backhaul channel(s) based on any of various criteria. The channel(s) can be selected based on inherent communication capabilities of the channel(s). For example, in the example of FIG. 1, channel(s) with the highest bandwidth, such as the 80 Mhz channel between 5735 Mhz and 5818 Mhz, can be selected to use for backhaul communications. The channel(s) can be selected based on actual communication capabilities. For example, once again referring to the example of FIG. 1, it may be that the 80 Mhz channel between 5170 Mhz and 5250 Mhz has the highest actual bandwidth, because of, e.g., interference on the other channels, and so that channel is selected to use for backhaul communications. The channel(s) can be selected based on RSSI (Received Signal Strength Indicator). For example, if a particular channel has the highest average RSSI, has the highest minimum RSSI, etc., at the units of the network, that particular channel can be selected to use for backhaul communications.

At block 2510, a wireless networking device identifies a second wireless communication channel to use for fronthaul communications. Further, more than one channel can be used for fronthaul communications. The wireless networking device of block 2510 can be the same wireless networking device of block 2505, or can be a different wireless networking device. The wireless networking device can select the initial channel(s) to use for fronthaul based on any of various criteria. The channel(s) can be selected based on inherent communication capabilities of the channel(s). For example, in the example of FIG. 1, channel(s) with bandwidth lower than the backhaul channel can be selected to use for fronthaul communications. The channel(s) can be selected based on actual communication capabilities. For example, once again referring to the example of FIG. 1, it may be that the 80 Mhz channel between 5170 Mhz and 5250 Mhz has the highest actual bandwidth and is selected for backhaul communications. In such a case, another channel or channels can be selected to use for fronthaul communications. The channel(s) can be selected based on RSSI. For example, if a particular channel has the highest average RSSI, has the highest minimum RSSI, etc., at the units of the network, that particular channel can be selected to use for backhaul communications, and a remaining channel(s) can be selected to use for fronthaul communications.

At block 2515, a wireless networking device determines interference characteristics of one or more channels of a plurality of channels of a wireless network. The wireless networking device can be a router or a satellite, and can be the same or a different wireless networking device of any or all of blocks 2505 and 2510. The wireless networking device scans one or more of the channels of the wireless network, and determines the interference characteristic of each of the channels. The characteristics can be any of various characteristics. The characteristics can include or indicate, for example, RSSI of communications received on the channel, whether transmissions on the channel saturate the receiver (such as from two wireless networking devices being placed too close to each other), whether a wireless device of another network is transmitting on the channel, whether a device, such as a baby monitor, a cordless phone, a Bluetooth device, a car alarm, a microwave oven, a video device, a ZigBee device, etc. is transmitting or emitting a signal on the channel, etc. The interference characteristics can include information regarding the duration, power level, repeat frequency, repeat pattern, etc., of the interfering signal, and the like. The characteristics can further include whether a radar is transmitting on the channel, such as a radar used by an airport.

At block 2520, a wireless networking device receives data via the backhaul channel from a second wireless networking device regarding interference characteristics determined by the second wireless networking device. The wireless networking device that receives the data can be the same wireless networking device that, at block 2515, determines the interference characteristics. In a wireless network with wireless network devices that include a router and one or more satellites, the wireless network devices are each located at different locations. As a result, the characteristics of the wireless channels as observed by the wireless network devices can differ due to differences in the local wireless environment. In an example, a user lives in an apartment building and he places a router against a wall in one room and places a satellite in another room. A wireless networking device of another apartment dweller is located only about one foot from the router on the other side of the wall. The interference that the apartment dweller's device causes for the router is substantially higher than the interference that it causes for the satellite, due to being located much closer to the router than to the satellite. In another example, a business places a router at one end of their floor space and places a satellite 100 meters away at the opposite end of their floor space. The router on a particular channel observes no interference, while the satellite on the same channel observes significant interference from a wireless device due to the device being located only 10 meters from the satellite, but being located 110 meters from the router. The types of characteristics determined by the second wireless networking device are of a similar type as are determined by the wireless networking device of block 2515.

At block 2525 a device categorizes the interference characteristics. The device can be any of the wireless networking devices of blocks 2505-2520, or can be another device, such as another wireless networking device or a computing device. It may be instructive to provide a few examples of various ways that the tasks of blocks 2505-2525 can be distributed. In a first example, the wireless networking device of blocks 2505-2520 are all a same wireless networking device, namely, a router, the second wireless device of block 2520 is a satellite (which also performs block 2515 prior to sending the data to the router at block 2520), and the device of block 2525 is the router. In a second example, the wireless networking device of blocks 2505-2520 is a router, the second wireless device of block 2520 is a satellite (which also performs block 2515 prior to sending the data to the router at block 2520), and the device of block 2525 is a cloud based computing system, which receives data, via the Internet from the router, that indicates the interference characteristics determined at block 2515 by the router and by the satellite. In a third example, the wireless networking device of block 2505 is a satellite, the wireless networking device of block 2510 is a router, the wireless networking device of block 2515 is the satellite, the wireless networking device of 2520 is the satellite, the second wireless device of block 2520 is the router (which also performs block 2515 prior to sending the data to the satellite at block 2520), and the device of block 2525 is a computing system that wirelessly receives from the satellite data that indicates the interferences characteristics determined at block 2515 by the router and by the satellite. The above examples are not exhaustive as to how the tasks of blocks 2505-2525 can be distributed, and various other distributions are possible.

The categories into which the device categorizes the interference characteristics can be any of various categories and can be based on any of various information. The categories can be, for example, a category for each of various ranges of RSSI levels that are detected, a category that identifies channels where RSSI above a certain threshold are detected, a category that identifies channels where receiver saturation is experienced, a category for each of various ranges of receiver saturation levels that are detected, a category that identifies other wireless networks that are detected, a category for each wireless network device of another network or each type of wireless network device of another network that are detected, a category for each of various types of devices that emit interfering signals that are detected, a category for each of various ranges of duration of interference, a category for each of various ranges of power levels of interference, a category for each of various ranges of repeat frequency of interference, a category for each of various types of repeat patterns of interference, a category identifying whether airport radar was detected, a category for each type of airport radar detected, and the like.

The categories can be based on, for example, RSSI of communications received on the channel, data regarding receiver saturation, data that indicates that a wireless device of another network is transmitting on the channel, data that indicates the type of device that is transmitting or emitting a signal on the channel, such as a baby monitor, a cordless phone, a Bluetooth device, a car alarm, a microwave oven, a video device, a ZigBee device, etc., among others. The categories can be based on, for example, the duration, power level, repeat frequency, repeat pattern, etc., of the interfering signal, and the like. The categories can further be based on whether a radar is transmitting on the channel, such as a radar used by an airport.

At block 2530, a device determines to use a third channel for backhaul communications based on the interference characteristics. The device can be any of the wireless networking devices of blocks 2505-2520, or can be the device of block 2525, or can be another device, such as another wireless networking device or another computing device. In a first example, the wireless networking device of blocks 2505-2520 are all a same wireless networking device, namely, a router, the second wireless device of block 2520 is a satellite (which also performs block 2515 prior to sending the data to the router at block 2520), and the device of blocks 2525 and 2530 is the router. In this example, the router, based on the interference characteristics determined at block 2515 by the router, or based on the data regarding interference characteristics received at block 2520 from the satellite, or based on the categorization of the interference characteristics determined at block 2525 by the router, determines a usage plan for the channels of the wireless network. The router, based on the interference characteristics determined at block 2515 by the router, or based on the data regarding interference characteristics received at block 2520 from the satellite, or based on the categorization of the interference characteristics determined at block 2525 by the router, determines that a third channel likely has the highest available bandwidth between the router and the satellite out of any backhaul channel, and determines that a fourth channel likely has the highest available bandwidth between the satellite and a client device out of any fronthaul channel.

The router determines to use the third channel for backhaul communications (block 2530) and sends a message via the current backhaul channel (i.e., the first channel) to the satellite to cause the satellite to switch to the third channel (block 2535), and the router and, in response, the satellite both switch to the third channel for backhaul communications. The router determines to use the fourth channel for fronthaul communications (block 2540) between the satellite and the client device. The router sends a message via the new backhaul channel (i.e., the third channel) to the satellite, which in turn forwards the message via the current fronthaul channel (i.e., the second channel) to the client device to cause the client device to switch to the fourth channel (block 2545) for fronthaul communications between the satellite and the client device. The satellite and, in response, the client device switch to the fourth channel for fronthaul communications.

In a second example, the wireless networking device of blocks 2505-2520 is a router, the second wireless device of block 2520 is a satellite (which also performs block 2515 prior to sending the data to the router at block 2520), and the device of blocks 2525 and 2530 is a cloud based computing system, which receives data, via the Internet from the router, that indicates the interference characteristics determined at block 2515 by the router and by the satellite. In this example, the cloud computer, based on the interference characteristics determined at block 2515 by the router, or based on the data regarding interference characteristics received at block 2520 from the satellite, or based on the categorization of the interference characteristics determined at block 2525 by the cloud computer, determines a usage plan for the channels of the wireless network. The cloud computer, based on the interference characteristics determined at block 2515 by the router, or based on the data regarding interference characteristics received at block 2520 from the satellite, or based on the categorization of the interference characteristics determined at block 2525 by the cloud computer, determines that a third channel likely has the lowest interference level and corresponding highest communication bandwidth between the router and the satellite out of any backhaul channel, and determines that a fourth channel likely has the lowest interference level and corresponding highest communication bandwidth out of any fronthaul channel.

The router determines to use the third channel for backhaul communications (block 2530) and sends a message via the current backhaul channel (i.e., the first channel) to the satellite to cause the satellite to switch to the third channel (block 2535), and the router and the satellite both switch to the third channel for backhaul communications. The router determines to use the fourth channel for fronthaul communications (block 2540) between the satellite and the client device. The router sends a message via the new backhaul channel (i.e., the third channel) to the satellite, which in turn forwards the message via the current fronthaul channel (i.e., the second channel) to the client device to cause the client device to switch to the fourth channel (block 2545) for fronthaul communications between the satellite and the client device. The satellite and, in response, the client device switch to the fourth channel for fronthaul communications.

In a third example, the wireless networking device of block 2505 is a satellite, the wireless networking device of block 2510 is a router, the wireless networking device of block 2515 is the satellite, the wireless networking device of 2520 is the satellite, the second wireless device of block 2520 is the router (which also performs block 2515 prior to sending the data to the satellite at block 2520), and the device of blocks 2525 and 2530 is a computing system that wirelessly receives from the satellite data that indicates the interferences characteristics determined at block 2515 by the router and by the satellite. The computing system is part of the same wireless network as the router and the satellite. In this example, the computing system, based on the interference characteristics determined at block 2515 by the satellite, or based on the data regarding interference characteristics received at block 2520 from the router, or based on the categorization of the interference characteristics determined at block 2525 by the computing system, determines a usage plan for the channels of the wireless network. The computing system, based on the interference characteristics determined at block 2515 by the satellite, or based on the data regarding interference characteristics received at block 2520 from the router, or based on the categorization of the interference characteristics determined at block 2525 by the computing system, determines, based on a low interference level detected at a third and fourth channel, that the third channel likely has the most reliable communication capabilities between the router and the satellite out of any backhaul channel, and determines that the fourth channel likely has the most reliable communication capabilities out of any fronthaul channel.

The router determines to use the third channel for backhaul communications (block 2530) and sends a message via the current backhaul channel (i.e., the first channel) to the satellite to cause the satellite to switch to the third channel (block 2535), and the router and the satellite both switch to the third channel for backhaul communications. The router determines to use the fourth channel for fronthaul communications (block 2540) between the satellite and the client device. The router sends a message via the new backhaul channel (i.e., the third channel) to the satellite, which in turn forwards the message via the current fronthaul channel (i.e., the second channel) to the client device to cause the client device to switch to the fourth channel (block 2545) for fronthaul communications between the satellite and the client device. The satellite and, in response, the client device switch to the fourth channel for fronthaul communications.

In a fourth example, the wireless networking device of blocks 2505-2520 are all a same wireless networking device, namely, a router, the second wireless device of block 2520 is a satellite (which also performs block 2515 prior to sending the data to the router at block 2520), and the device of blocks 2525 and 2530 is the router. In this example, the router, based on the interference characteristics determined at block 2515 by the router, or based on the data regarding interference characteristics received at block 2520 from the satellite, or based on the categorization of the interference characteristics determined at block 2525 by the router, determines a usage plan for the channels of the wireless network. The router, based on the interference characteristics determined at block 2515 by the router, or based on the data regarding interference characteristics received at block 2520 from the satellite, or based on the categorization of the interference characteristics determined at block 2525 by the router, determines that a source of interference on one or more channels is a radar system being used by a local airport for a radar system. As a result of there being a local airport, the router determines that certain of the channels are barred and cannot be used, as the government bars transmission on certain channels when the transmission may interfere with airport radar. The router determines that a third channel likely has the highest available bandwidth between the router and the satellite out of any non-barred backhaul channel, and determines that a fourth channel likely has the highest available bandwidth between the satellite and a client device out of any non-barred fronthaul channel.

The router determines to use the third channel for backhaul communications (block 2530) and sends a message via the current backhaul channel (i.e., the first channel) to the satellite to cause the satellite to switch to the third channel (block 2535), and the router and, in response, the satellite both switch to the third channel for backhaul communications. The router determines to use the fourth channel for fronthaul communications (block 2540) between the satellite and the client device. The router sends a message via the new backhaul channel (i.e., the third channel) to the satellite, which in turn forwards the message via the current fronthaul channel (i.e., the second channel) to the client device to cause the client device to switch to the fourth channel (block 2545) for fronthaul communications between the satellite and the client device. The satellite and, in response, the client device switch to the fourth channel for fronthaul communications.

The determination of blocks 2530 or 2540 can be based on the interference characteristics in any of various ways. For example, some interfering devices broadcast interference signals that follow a certain pattern. A device, such as a baby monitor, may have a pattern of broadcasting for a significant period of time, followed by a period of not broadcasting for a significant period of time. Based on this pattern, a determination could be made at block 2530 or 2540 to start using the channel as soon as the interference characteristics indicate that the device is no longer broadcasting, and to stop using the channel as soon as the interference characteristics indicate that the device begins broadcasting again. As another example, the interference characteristics can be gathered over a period of time for a particular channel, and the interference patterns can be analyzed to determine historical usage patterns. In one case, the interference characteristics of the particular channel are analyzed, and a determination is made that the particular channel experiences significant interference from 7 am to 7 pm on Monday through Friday, and experiences low interference at other times. Based on the historical usage pattern, a determination can be made to not use the particular channel between 7 am and 7 pm on Monday through Friday, and to use the particular channel during the remaining days and times.

In yet another example, the interference characteristics indicate that a microwave over emits electromagnetic radiation on a particular channel, and that when the microwave begins to emit the radiation, it typically emits for a duration of between 1 minutes and 5 minutes. Based on the historical duration pattern of the microwave radiation emissions, a determination can be made at block 2530 or 2540, once the interference characteristics indicate that the microwave is emitting radiation on the particular channel, to not use the particular channel, and to check the channel once a second to determine if the microwave has ceased emitting radiation, at which point a determination can be made to once again use the particular channel.

In another example, the interference characteristics indicate a beacon from another wireless networking device. Based on the beacon, the wireless networking device that transmitted the beacon can be identified and categorized as a particular type of device. Based on the categorization of the type of device, a determination can be made at block 2530 or 2540 to use or not use a particular channel. For example, when the particular type of device is a device that has previously been determined to work well with other wireless networking devices and to share channel bandwidth well, a determination can be made to use the same channel that the wireless networking device that transmitted the beacon is using. Conversely, when the particular type of device is a device that has previously been determined to not work well with other wireless networking devices and to not share channel bandwidth well, a determination can be made at block 2530 or 2540 to avoid the particular channel that the wireless networking device that transmitted the beacon is using.

In a further example, the interference characteristics indicate a certain power level of the interference on a particular channel. Based on the indicated interference power level, a determination can be made at block 2530 or 2540 to use or to not use a particular channel.

The above examples are not exhaustive as to how the tasks of blocks 2505-2545 can be distributed, and various other distributions are possible.

Wireless Optimization Using Artificial Intelligence and Machine Learning

Figure 3:
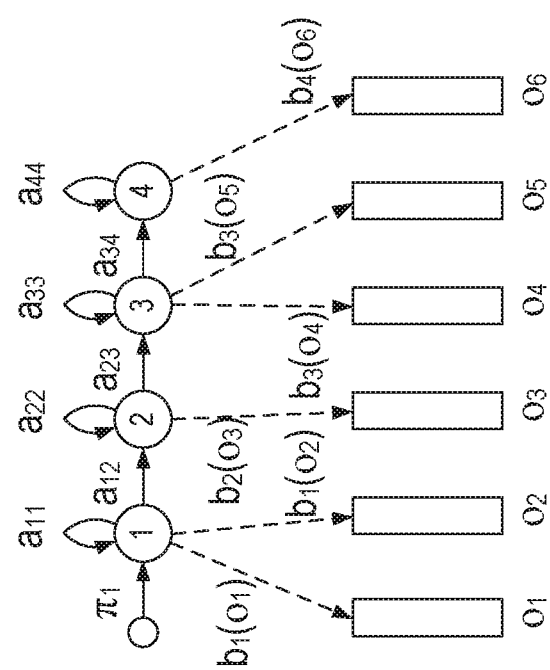
FIG. 3 illustrates an example of a state machine for hidden Markov model, consistent with various embodiments.

The system can use artificial intelligence (AI) and machine learning (ML) technologies to model the interference on each channel. For example, units of the system can measure channel interference regularly over the time of day on all radios. The interference information is communicated to the base unit or a cloud server for pattern analysis. The measure interference includes interference from units within the system as well as interference from nearby devices. The base unit or the cloud server can recognize the pattern of the interference. For example, the base unit or the cloud server can use a hidden Markov model (HMM) to model patterns of channel interference, channel capacity and channel outage. FIG. 3 illustrates an example of a state machine for HMM.

The system can also use AI and ML technologies to model network traffic. The units of the system can measure the traffic that is being supported during the day and reports the measurement to the base unit or the cloud server. The base unit or the cloud server can model the traffic usage using HMM or other statistical modeling tools. The statistical model is trained to predict the traffic that is being used on each unit of the system and the traffic can be used to decide which unit gets priority for network communication. For example, statistical modeling tools can be used to predict link overloading or excessive link delays, and network topologies can be changed to avoid the predicted link overloading or excessive delays, thereby resulting in improved network reliability.

The system can use different utility functions on top of channel models for modeling different types of traffic and then optimize the channel accordingly. For example, a voice application may not need lots of bandwidth but may require a more reliable communication channel. A suitable channel can be selected for a unit that serves a voice application.

The system can also use AI and ML technologies to model client location pattern for roaming purposes. Roaming is when a client moves from communicating within the system via a first wireless networking device to communicating via a second wireless networking device because, e.g., the signal strength from the first wireless networking device is too weak. For example, the system can learn from the pattern that when client device's RSSI (Received Signal Strength Indicator) drops on some unit, it is likely that the client device is moving to another location and that the client device should be roamed from one unit to another unit or not. Such learning can be used to avoid extra information connection and avoid unnecessary state transitions between units.

Figure 4:
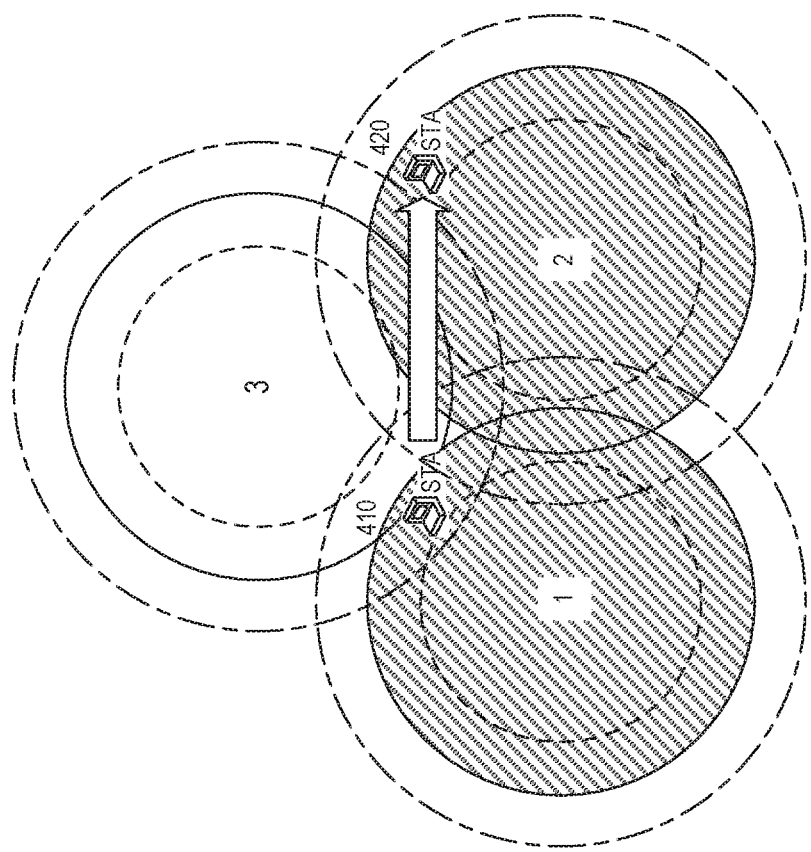
FIG. 4 illustrates an example of a pattern of client device location, consistent with various embodiments.

FIG. 4 illustrates an example of a pattern of client device location. The system recognizes a pattern that the client device STA moves from a location 410 to a location 420 in a predictable manner. Even though during the movement STA will travel through an area covered by unit 3, the system predicts that STA will move to location 420 covered by unit 2. Therefore, in some embodiments, the system will not roam the client device STA from unit 1 to unit 3 as the client device STA moves from location 410 to location 420. Instead, the system will directly roam the client device STA from unit 1 to unit 2.

The system can also use AI and ML technologies to learn client roaming behavior, since different clients behave differently in terms of roaming. Some legacy clients, such as those that do not support IEEE 802.11v/11k/11r (referred to herein as 11v, or 11k, or 11r), may be roamed using disconnection and then letting the client associate on a suitable band of a suitable unit. In some embodiments, the following routing can be done only once every T1 time period. A de-authentication packet can sent to client once RSSI and other conditions are met. The client can be allowed to roam back on the desired unit and band. If the client does not roam to the desired unit and band in time T2, the system can allow the client to roam to any unit (AP) of the system.

The timing of roaming of legacy client can be important, so that the client does not blacklist the access point (unit of the system). For example, the client may blacklist a particular unit if the unit is de-authenticated too often, or in too short of a time period (e.g., in less than T1). The system can be trained by conducting testing on clients and recognizing how often a client is disconnected or how long the client takes to re-connect. The training can be used as initial setting. Data that is collected in the field can be used to change timings such as T1 and T2.

The system can be trained to learn different types of client behaviors. For example, clients may respond to some type of 11k report and may not respond to some other 11k report. A client may respond to 11k once every T seconds. A client may roam in response to a BSS Transition Management (BTM) once every T seconds. A client may roam in response to BTM when RSSI of serving AP (satellite unit) or host AP (base unit) is in certain range. The system can also learn when to request BTM and how often to request BTM.

The system can also use AI and ML technologies to optimize network topology of the units based on usage pattern. The system can monitor the network traffic and determine the network topology. For example, based on the usage pattern, the system can determine a backhaul channel, the satellite units directly connected to the base unit through backhaul channel, fronthaul channel, number of clients, etc. The system can make decisions dynamically based on the usage pattern. For example, APs (satellite units) with more traffic can get connection directly with main AP (base unit) on cleanest channel. APs (units) with higher amounts of traffic can get better client facing channels. APs (units) with higher amounts of traffic may push some clients to other APs (units).

Interference Management

Figure 5:
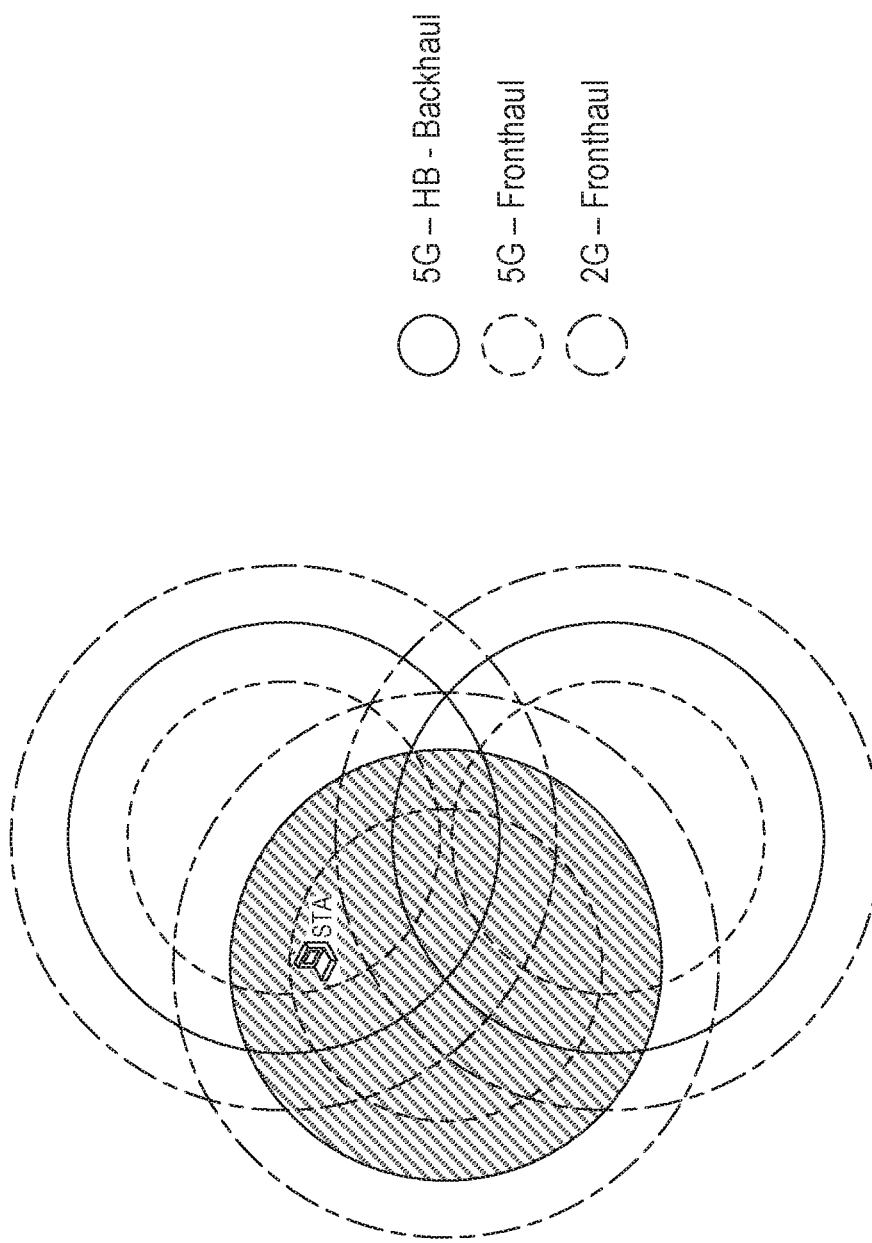
FIG. 5 shows inferences within units of the system on 2 GHz and 5 GHz, consistent with various embodiments.
Figure 6:
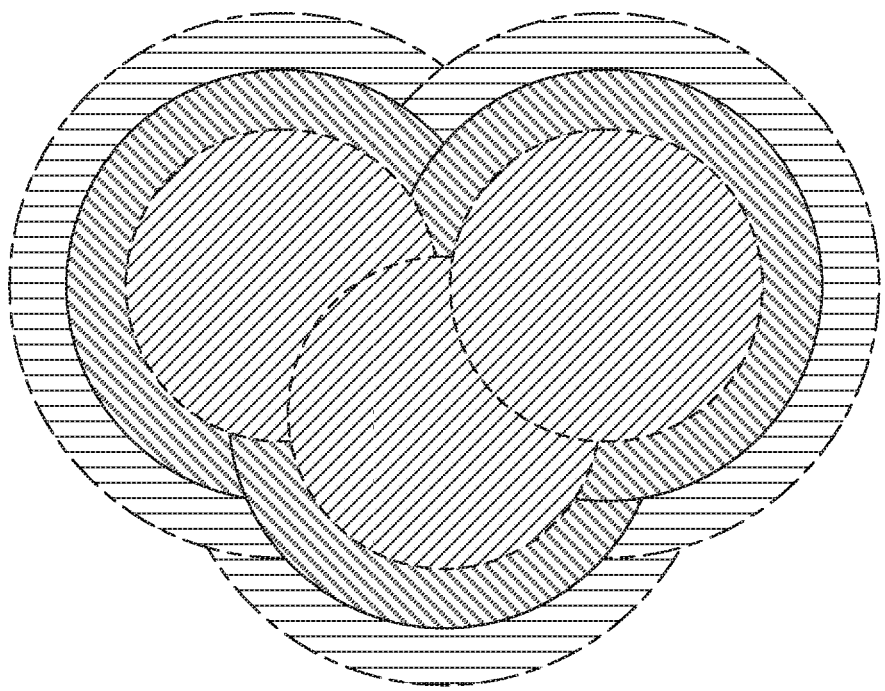
FIG. 6 shows transmit and receive overlapping between the units, consistent with various embodiments.
Figure 6:
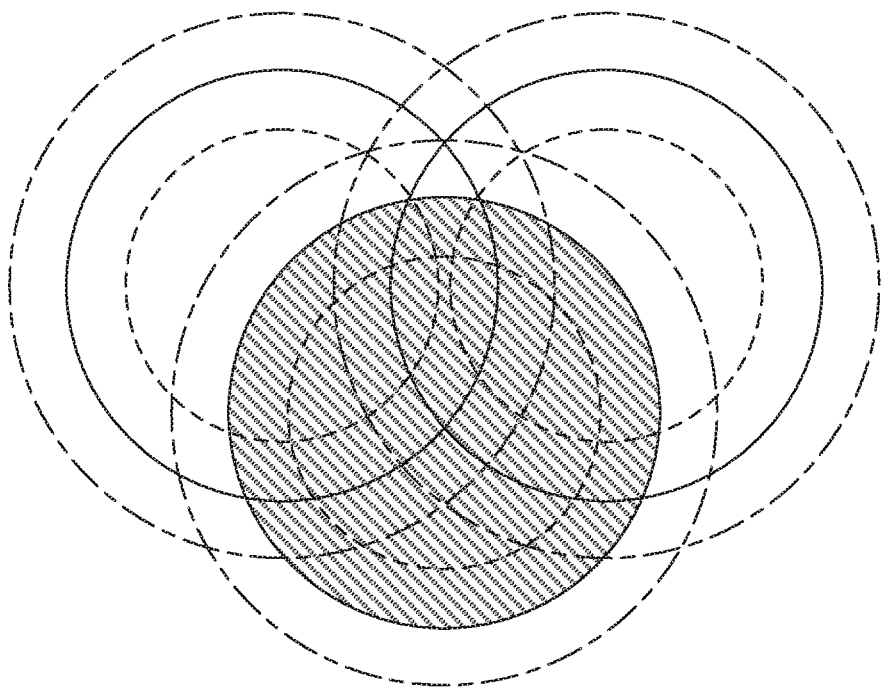

A conventional router is a single device. In contrast, the disclosed multi-band wireless networking system includes multiple units (APs) to cover a broader area. Each unit of the multi-band wireless networking system is capable of transmitting wireless radio signals over multiple bands. Thus, the units within the system may overlap and interfere with each other. Furthermore, other devices that not part of the system can also interfere with the units of the system. For example, FIG. 5 shows inferences within units of the system on 2 GHz and 5 GHz. FIG. 6 shows transmit and receive overlapping between the units.

In order to manage RF (radio frequency) interference on the transmit side, the system uses an algorithm to manage power levels of the units of the system. In some embodiments, the management of power levels can be built in the system management software of the units. The power level management can take into account the power levels (e.g., RSSI) between different units of the system and the power levels (e.g., RSSI) of associated clients.

In some embodiments, a unit can increase the power level for a limited duration to check if any new clients can connect to the unit. The unit can then drop to a power level that minimizes the interference. The power management of system can use the backhaul channel to control the power level of the units. The system also takes into account information such as client locations for power management purposes.

In order to manage RF interference on receive side, the system can adjust the physical layer receive range by adjusting physical radio gain. The system can set up digital thresholds, such as preamble detection threshold and timing and carrier recover thresholds. The system can also include controllable attenuation features to attenuate the radio power.

In some embodiments, the energy detection threshold for each radio component of each unit can be managed separately. The system can also manage back-off count down numbers. For example, the system can modify 802.11 NAV parameters to manage the back-off count down numbers. The system can also optimize or adjust beamforming and MU-MIMO (multi-user multiple-input and multiple-output) parameters. The system can also modify RTS/CTS (Request to Send/Clear to Send) parameters of IEEE 802.11 wireless networking protocols to reduce frame collisions.

Figure 7:
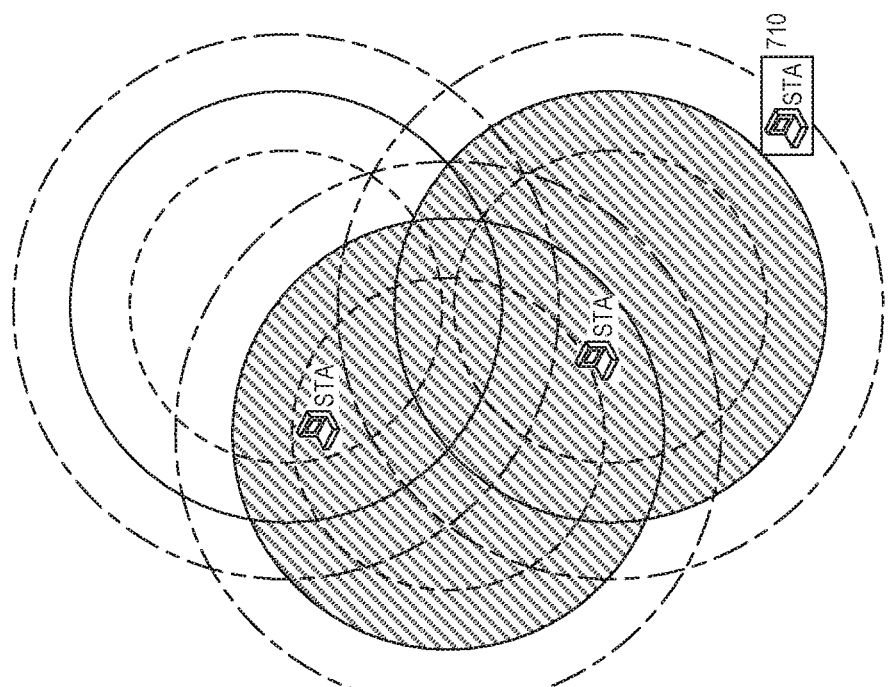
FIG. 7 shows a client device on the coverage edge of the system units, consistent with various embodiments.

For fronthaul management, the system tries to minimize the overlap between different units of the system in a way that clients on the coverage edge do not get disconnected. For example, FIG. 7 shows a client device 710 on the coverage edge of the system units. The system tries to minimize the overlap but the wireless coverage is still enough to connect the client device 710.

In order to connect to a client at the edge of a coverage area, units of the system can drop their transmit power based on the client RSSI and other client information. A unit can drop the power till the client has a desirable transmit rate, relative to the transmit rate of the client had before the power was dropped. A unit can also increase transmit power once every X ms (milliseconds) for a period of Y ms. The unit can check whether any client tries to associate wireless with the unit, and can verify whether the association was successful.

The units of the system can adjust the receive range as well. In order to connect the client on edge, the units of the system can drop the receive range based on client RSSI and other client information. A unit can drops receive range till all clients have a desirable receive rate, compared to what the clients had before the receive range was dropped. A unit can also increase receive power once every X ms (milliseconds) for a period of Y ms. The unit checks whether any clients try to associate wireless with the unit and whether the association is successful. In some embodiments, the increasing of transmit range and the increasing of receive range can be conducted at the same time.

In some embodiments, the system can learn the locations of the clients and adjust transmit or receive power levels depending on each client's location and receive sensitivity.

Dedicated Control Channel

In some embodiments, the system can use a dedicated or substantially dedicated channel (e.g., outside of 2.4 GHz or 5 GHz bands) for control information. For example, the units of the system might use 433 MHz or 900 MHz. The system can conduct frequency hopping between different channels. The units can include wireless radio component to communicate via the dedicated channel for control information. The dedicated channel will make the network among the units of the system more robust, such as when WiFi channels on 2.4 GHz or 5 GHz have intermittent issues.

The dedicated control channel is used to transfer critical messages, such as bridge update (e.g., where client is associated), roaming coordination, timing synchronization, range measurement, etc. The dedicated channel can also be used for synchronization between units for localization purpose.

The dedicated control channel can also be used for provisioning. For example, the system can use the control channel to add a new unit to the network of the system without having to go through a standard process for WiFi, which takes a longer time and is prone to interference and packet loss. An interface can be defined on control channel which enables the current unit (AP) on the system network to provision a new unit (AP) when the system administrator approve the addition of the new unit (AP).

If a satellite unit drops offline from the 2.4 GHz or 5 GHz WiFi network, units of the system can still signal each other indicating that the satellite unit is dropped from the WiFi network. This is feasible because the control channel can have a longer range that the 2.4 GHz or 5 GHz WiFi network. The units of the system can also signal each other regarding a change of the backhaul channel through the dedicated control channel.

Protocol Tunneling

There are various types of protocols that can be bridged (tunneling) over the backhaul channel of the system. For example, Internet of Things (IoT) protocols are low data-rate protocols that can be bridged over the backhaul channel. The advantage is that some of the IoT protocols have very limited range. By carrying over the backhaul channel, devices using IoT protocols can communicate over a range longer than the original IoT protocols cannot handle. Likewise, Bluetooth range can be extended for various applications such as IoT applications or audio applications.

The system can use different channels on different units for tunneling different IoT protocols. In some embodiments, units of the system can have both WiFi and BLE (Bluetooth low energy) capability. Depending on the type of interfaces for the sensory devices, the units can use WiFi to connect to the devices, or use BLE to connect to the devices and tunnel the BLE communication over the backhaul channel. In some embodiments, one IoT protocol can be tunneling communications of another IoT protocol. The tunneling can be used for synchronization, protocol coexistence, power saving, etc.

Using the tunneling, the system can extend range for perimeter sensors such as window sensor, door sensor, thermal sensor, moving sensor, etc. A sensor can connect to a nearest unit of the system. The network traffic from the sensor is tunneled to the base unit and other satellite units via the backhaul channel. The network traffic from the sensor can also be relayed to a cloud.

An instruction or action for the sensor can be transmitted to the sensor through the tunneling using the backhaul channel. A sensor may trigger an action for a target device, e.g., triggering an alarm or turning on a light. The target device (e.g., alarm or light) may be connected to another unit of the system. The sensor and the target device may communicate over a protocol such as Bluetooth, ZigBee, Zwave, etc. The protocol is tunneled through the WiFi backhaul channel.

In some embodiments, the system can control lights around a home using Bluetooth or other technologies. Bluetooth lighting control is becoming prominent but Bluetooth range. By tunneling the Bluetooth communications over the WiFi backhaul channel, the control range for the lights is significantly extended.

In some embodiments, the system can control audio speakers over a wide range. Audio speaker using Bluetooth is popular but range is limited. The Bluetooth speaker can be paired with the units of the system. The audio synchronization over Bluetooth can be tunneled through the WiFi backhaul channel. The system can simultaneously control different types of Bluetooth speakers.

Zwave is used on lot of sensors and actuators but the range is limited. The system can avoid Zwave mesh and use a long range backhaul to create a more robust Zwave network.

Topology Optimization

The units of the system (base unit(s) and satellite unit(s)) can form a network using different types of topology. For example, a Daisy chain can be formed during initial boot up of a unit. The unit connects to the base if the wireless connection to the base is better than a predetermined threshold. If connection to base is less than a predetermined threshold, the unit can look for base backhaul through a wireless connection to another satellite unit. An optimal backhaul is selected using a link that maximizes a predetermined criterion. After an initial backhaul selection is completed, a periodic optimization of topology can be done. Further, future optimizations can be based on optimizing different criteria.

In some embodiments, each AP (unit) in a system network will advertise its uplink throughput (TPUT) to main AP/base unit (uplink_i). The AP (unit) also advertises other factors including its form factor info, current load on the AP, and other information. The system uses a lookup table to map RSSI of beacon to effective TPUT. Accordingly, for each beacon, the system can conduct an effective TPUT mapping (TPUT_lookedup_i).

Each AP (unit) in a system network can advertise. In some embodiments, the following formula may be used to select an uplink node selection with the best TPUT_i:

$$1/TPUT\_i = 1(1/(uplink\_i*scaling\_factor\_1) + 1/(TPUT\_lookedup\_i*scaling\_factor1))*scaling\_factor\_3*function(hop\_count)$$

The system can also consider vendor IE content, such as capability, dedicated band, hop count, steering capabilities, transmit power, device type, scaling factors, receive sensitivity, etc. In some embodiments, the vendor content is in layer 2. The system can also consider other parameters that can be communicated in higher layers, such as traffic type, traffic priority, client type, client priority, etc.

In some embodiments, the system has scheduled topology optimization after the boot up phase. In other words, the topology can be optimized on a regular basis. During an optimization phase (e.g., when the topology is being optimized), information can be collected during the time that units of the system are up and running. For example, RSSI information can be measured to characterize the RSSI from certain units of the system to other units of the system. Interference can be measured on all units of the system. The system monitors traffic to supported clients to see how much load needs to be supported for each unit.

The system can also perform event-driven topology optimization. For example, if backhaul link quality on any unit drops below some threshold, the unit may look for a new backhaul configuration. If effective TPUT to main AP (base unit) drops below some threshold, a unit of the system may look for an alternative channel to use for backhaul. The information collected over time will be used for event driven topology optimization.

The system can perform a topology optimization to turn off a unit or a radio on a unit. For example, if two units are physically close to each other, those two units may hamper wireless coverage. For example, clients may be switched (e.g., via roaming) back and forth between the two units. To improve coverage in such a situation, the system can send a message to one of the units that causes the unit to turn off a radio. By causing the unit to power down the radio, the system reduces interference and unnecessary client roaming. The unit is still connected via the backhaul channel and the radio that was turned off can be turned on again at any time.

In some embodiments, some units of the system may utilize different power settings and receive ranges. The topology and client facing radio and backhaul coverage can interact. If a topology is selected such that a unit is located between two other units in a daisy chain, the backhaul channel power may be adjusted or optimized so that the units that need to receive messages via the backhaul are able to, but broadcast power on the backhaul channel may not be increased to enable backhaul reception by other units that do not need to receive messages via the backhaul. Interference can be minimized by utilizing such a technique. The backhaul range may be increased periodically, such as by increasing broadcast power, to see if additional units can connect to a unit of the system or if the unit can find an alternative superior topology.

In some embodiments, some units may use different channels for backhaul. In some cases, a client facing radio may be used as backhaul. Particularly, this may be done at an edge of a wireless network. This can also be useful if a backhaul channel is busy, such as due to extensive traffic on part of the network. When a client facing radio is used for backhaul traffic, the backhaul channel can be reevaluated periodically to see if the unit can once again use the backhaul channel for backhaul traffic.

Figure 8:
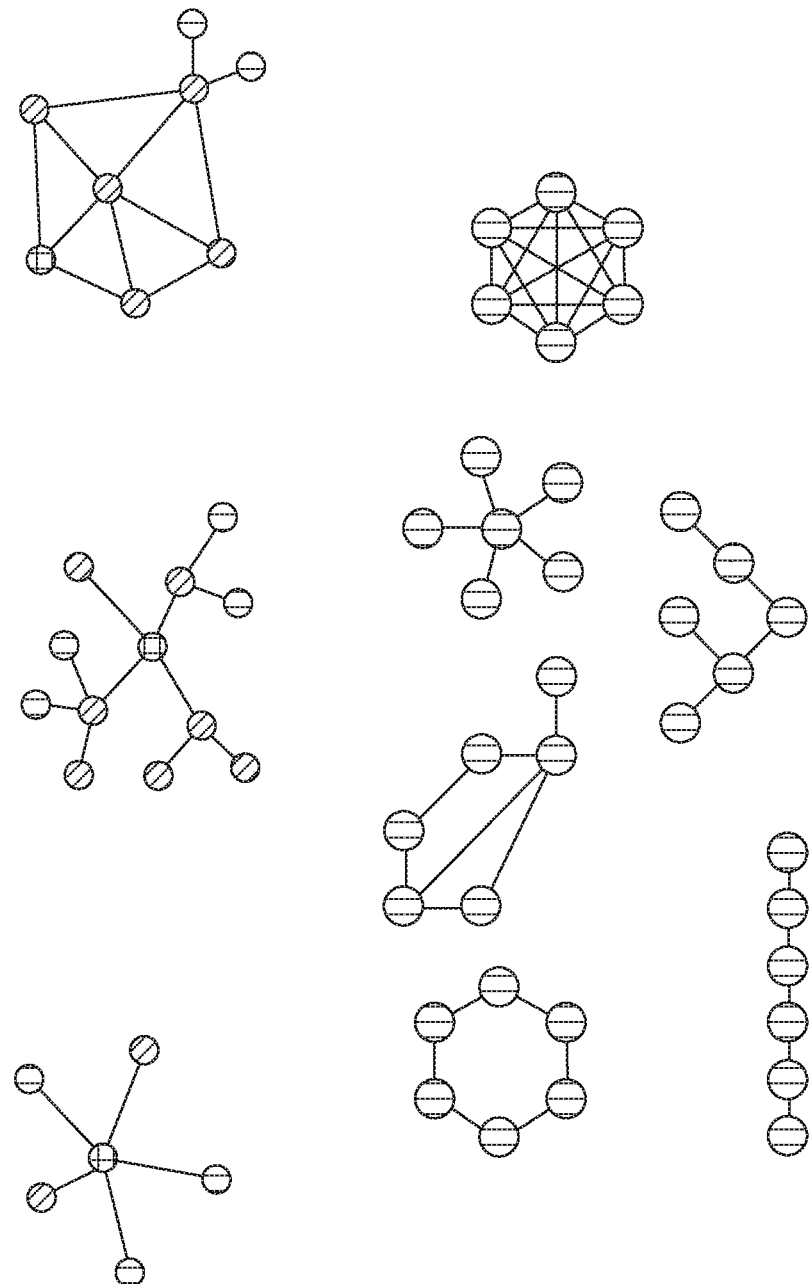
FIG. 8 shows different types of network topologies, consistent with various embodiments.

Different topologies may be used based on traffic needs and different types of units, such as desktop units, wall-plug units, mini units. etc. Different types of units can have different requirements for power levels. FIG. 8 shows different types of network topologies.

The system can use different algorithms (e.g., Dijkstra's algorithm) to determine the best communication path between two units within the system. The system can change the weight values not only based on TPUT but also based on interference and priorities: such as TPUT_lookedup_i*interference_weight*supported_traffic*Orbi_type*cpu. The system can also use other algorithms, such as Bellman-Ford algorithm, A* algorithm, Floyd-Warshall algorithm, etc.

Figure 24:
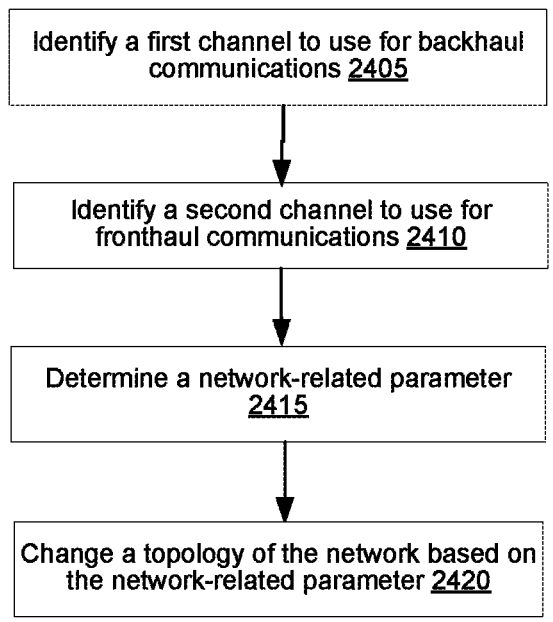
FIG. 24 illustrates a method for changing topology of a Wi-Fi network, consistent with various embodiments.

FIG. 24 illustrates a method for changing topology of a Wi-Fi network. At block 2405, a wireless networking device identifies a first wireless communication channel to use for backhaul communications. The channel to use for backhaul can be selected based on any of various criteria. The channel can be selected based on inherent communication capabilities of the channel. For example, in the example of FIG. 1, the channel with the highest bandwidth, such as the 80 Mhz channel between 5735 Mhz and 5818 Mhz, can be selected to use for backhaul communications. The channel can be selected based on actual communication capabilities. For example, once again referring to the example of FIG. 1, it may be that the 80 Mhz channel between 5170 Mhz and 5250 Mhz has the highest actual bandwidth, because of, e.g., interference on the other channels, and so that channel is selected to use for backhaul communications. The channel can be selected based on RSSI. For example, if a particular channel has the highest average RSSI, has the highest minimum RSSI, etc., at the units of the network, that particular channel can be selected to use for backhaul communications.

At block 2410, a wireless networking device identifies a second wireless communication channel to use for fronthaul communications. The wireless networking device of block 2410 can be the same wireless networking device of block 2405, or can be a different wireless networking device. The channel to use for fronthaul can be selected based on any of various criteria. Further, more than one channel can be used for fronthaul communications. The channel(s) can be selected based on inherent communication capabilities of the channel(s). For example, in the example of FIG. 1, the channel(s) with bandwidth lower than the backhaul channel can be selected to use for fronthaul communications. The channel(s) can be selected based on actual communication capabilities. For example, once again referring to the example of FIG. 1, it may be that the 80 Mhz channel between 5170 Mhz and 5250 Mhz has the highest actual bandwidth and is selected for backhaul communications. In such a case, another channel or channels can be selected to use for fronthaul communications. The channel(s) can be selected based on RSSI. For example, if a particular channel has the highest average RSSI, has the highest minimum RSSI, etc., at the units of the network, that particular channel can be selected to use for backhaul communications, and a remaining channel(s) can be selected to use for fronthaul communications.

At block 2415, a wireless networking device determines a network-related parameter. The wireless networking device of block 2410 can be the same wireless networking device of block 2405, or of block 2410, or can be a different wireless networking device. The network-related parameter can be any of various network-related parameters. In an example, the parameter is a latency-related parameter, such as the latency of communication between two devices, and the wireless networking device determines the latency by measuring the latency of communications between the two devices. In an example, a user joins a video game where he is playing with other friends via an online service, such as Xbox Live. He starts the video game via a gaming system, such as an Xbox 360, which connects to a first wireless networking device, which can be a satellite device, via a fronthaul channel. The first wireless networking device then connects to a second wireless networking device, which can be an access point Wi-Fi device, via a backhaul channel, where the second wireless networking device is able to access the Internet and send messages to an Xbox used by another player in the online game. The first wireless device, the second wireless device, as well as a Wi-Fi access point device, and a satellite device can each be a Wi-Fi network control device. The wireless networking device determines the latency by measuring the latency between the two Xbox systems (block 2415).

In some embodiments, a wireless networking device determines latency requirements of a gaming system (block 2415) via Deep Packet Inspection (DPI). In an example, the wireless networking device examines a header or data of a packet sent by a gaming system. The packet includes an identifier that identifies the type of gaming system. The wireless networking device accesses a database that includes device identifiers, device version identifiers, application identifiers, application version identifiers, among others. The wireless networking device determines, by correlating the identifier obtained from the packet with an identifier in the database, the type of the gaming system. The database further includes data regarding latency requirements for the gaming system, and the wireless networking device determines the latency requirements for the gaming system based on the latency data obtained from the database (block 2415).

In an online gaming environment, the latency of communication is important, as a long latency connection will suffer longer lag times between when the user activates a gaming controller and when a corresponding action occurs in the video game. In such a situation, a wireless networking device can change the topology of the network based on a network-related parameter, such as the measured latency between two devices or the latency requirement of a device (block 2420). For example, a wireless networking device can send a message that causes the Xbox game to communicate with the first wireless networking device via the higher bandwidth backhaul channel, or can cause the Xbox game to communicate directly with the first wireless communication device via the backhaul channel. Such a change can lower the latency of communication between the two Xbox systems, which can enhance the user experience. Examples of gaming systems include Nintendo Wii, Nintendo Wii U, Sony PlayStation 3, Sony PlayStation 4, Microsoft Xbox 360, Microsoft Xbox One, etc. Each wireless networking device of blocks 2405-2420 can each be one physical device, can each be different physical device, can be any of various combinations of same or different physical devices, etc.

In another example, the network-related parameter of block 2415 is a signal strength related parameter, such as RSSI. A first channel is initially selected to use for backhaul communications. Periodically, a wireless communication device determines the RSSI of the various channels at the various units and clients (block 2415). For example, the wireless communication device can communicate with any or all of the other wireless communication devices and clients and have each determine RSSI of each channel that the device/client is receiving. In this example, the backhaul channel is experiencing interference, so the average RSSI of another channel is higher than the backhaul channel. The wireless communication device sends a message to the other devices to cause them to temporarily send backhaul communications via another channel (block 2420). The wireless communication device continues its periodic monitoring of RSSI (block 2415), and, once the interference subsides and the RSSI of the backhaul channel recovers to acceptable levels, the wireless communication device sends a message to the other devices to have them once again send backhaul traffic via the backhaul channel (block 2420).

In yet another example, the network-related parameter of block 2415 is a detection of a device. A user with a smartphone returns home, and enters the coverage area of his home Wi-Fi network. A wireless networking device detects the smartphone (block 2415). Based on past history of movement of the smartphone, such as when the user returns home at a similar time on a similar day of the week, the wireless networking device determines that the user will likely go to a certain area of the house. For example, referring to FIG. 4, the wireless networking device anticipates that the user will travel from location 410 to location 420. Given this past history, the wireless networking device determines to have the smartphone roam directly from unit 1 of FIG. 4 to unit 2 of FIG. 4 (block 2420), and to bypass roaming to unit 3 of FIG. 4, even though the smartphone passes through the coverage area of unit 3.

In another example, the network-related parameter of block 2415 is a data-traffic-related parameter. A wireless networking device determines that a bandwidth need of a video device has increased (block 2415), such as due to streaming a high definition video. The video device is communicating with the wireless networking device via a fronthaul channel, and the wireless networking device determines to have the video device switch from the fronthaul channel to the higher bandwidth backhaul channel for streaming the video (block 2420).

In yet another example, the network-related parameter of block 2415 is a signal strength-related parameter. A wireless networking device determines that two other wireless networking devices, a first device and a second device, are physically close to each other based on an RSSI of a signal broadcast from the first device to the second device being above a certain threshold (block 245). Because the two devices are physically close, their areas of coverage are similar. This can result in a client device roaming between the two devices while it is in the area covered by both devices. The devices being physically close can also result is higher interference on the communication channels. To avoid the interference and unnecessary roaming, the wireless communication device sends a message that causes one of the devices to stop broadcasting with its radio (block 2420). The device that stopped broadcasting continues to monitor the backhaul channel, and can resume broadcasting if so directed by an incoming message, after a predetermined period of time, etc.

In another example, the network-related parameter of block 2415 is a detection of a type of device. A user installs a home security system, which includes a motion activated video camera that the user installs inside of his house. The security system is programmed to send a message to a user's smartphone to notify the user of an intruder when the motion activated video camera activates while the security system is alarmed. Once the security system is installed and activated, the security system begins to communicate with a wireless networking device. The wireless networking device detects that the communication is from a security system (block 2415), and determines, based on the device being a security system, that communications from the security system are high priority. In some embodiments, the detection that the communication is from a security system is made via DPI. The wireless networking device sends a message to the security system that causes the security system to send broadcasts on multiple channels when sending a message (block 2420), such as on both a backhaul channel and a fronthaul channel. By sending a message on multiple channels, the message has a higher likelihood of being received by the receiving device when an issue occurs, such as interference on one of the channels. The wireless networking device can also broadcast a message to the security system on multiple channels in order to, e.g., increase the reliability of communication with the security system.

In another example where the network-related parameter of block 2415 is a detection of a type of device, a wireless networking device detects a new type of device via DPI. The wireless networking device examines a header or data of a packet sent by a gaming system. The packet includes an identifier that identifies the type of gaming system. The wireless networking device accesses a database that includes device identifiers, device version identifiers, application identifiers, application version identifiers, among others. The wireless networking device determines, by correlating the identifier obtained from the packet with an identifier in the database, the type of the gaming system (block 2415). The database further includes data regarding latency requirements for the gaming system, and the wireless networking device determines the latency requirements for the gaming system based on the latency data obtained from the database (block 2415). The wireless networking device determines, based on the type of the device and the latency requirements of the device, to send data of the gaming system via the higher bandwidth backhaul channel (block 2420).

In yet another example, the network-related parameter of block 2415 is a detection of a particular mode of a device. A user uses a particular model of smartphone, and the wireless networking device communicates with the smartphone and determines, based on the communication, that the smartphone is the particular model (block 2415). The wireless networking device determines that this particular model of smartphone is a model that has problems roaming. To cause the smartphone to roam from a first wireless networking device to a second wireless networking device, the wireless networking device sends a message to the first wireless networking device that causes the first wireless networking device to stop broadcasting (block 2420). The smartphone, in response to the first wireless networking device stopping broadcasting, roams to the second networking device.

The wireless networking device can cause a topology of the network to change in any of various ways. In a first example, the wireless networking device sends a message to each device on the network instructing each device to stop transmitting at 8:00:00 pm, and to swap channels used for backhaul and fronthaul communications at 8:00:05 pm, and to start transmitting once again at 8:00:10 pm. In a second example, the wireless networking device selects a first device and sends a message that instructs the first device to swap channels used for backhaul and fronthaul immediately. Once the wireless networking device determines that the first device has successfully swapped channels, the wireless networking device does the same for a second device. The wireless networking device continues this process until each of the devices has swapped channels.

Security and Intruder Detection

Network Security is important. Nowadays almost everybody has a phone with them when they move. The phone may be used to detect an intruder of the network. Particularly, intruder detection can use solution of monitoring WiFi and Bluetooth activities with the multiple units of the system. Indoor localization techniques can also be used. The system may monitor probe request to detect presence of a new device. If a certain RSSI pattern is seen on new MAC address, the information can be used for intruder detection. Also, certain time of arrival or round trip delay on a new MAC address or AID may be used to detect intruder.

Figure 9:
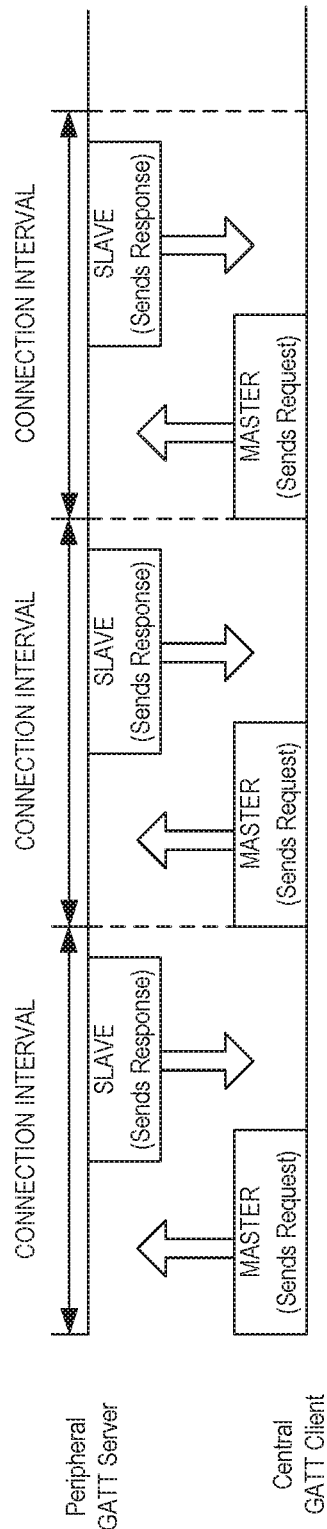
FIG. 9 shows the communications between GATT (Generic Attributes) servers and clients, consistent with various embodiments.

Particularly, GATT (Generic Attributes) Profile usage for intruder detection. FIG. 9 shows the communications between GATT servers and clients. The system can use GATT MAC address and UUID (universally unique identifier) to detect new devices. Signal strength or time of arrival of SLAVE response may also be used.

The system may use the localization techniques available on WiFi and Bluetooth for intrude detection if device is known or the system can localize a new unknown device. The system can use long dedicated backhaul to do the coordination between units as a detection mechanism for intruders. The system can use Bluetooth packets that can be sent to a new device to detect an intruder. The system can use pre-association WiFi for intruder detection. The system can combine all methods available for pre-association of WiFi and for new Bluetooth device to provide robust intruder detection. The system can use higher frequencies such as 28 GHz, 60 GHz for more accurate radar type intruder detection.

When intruder is detected the information may be communicated to the user via, e.g., phone app, audio alarm, lighting alarm, email, text message, phone call, etc. Video may be recorded using in home camera when intruder is detected. Audio may also be recorded.

Figure 10:
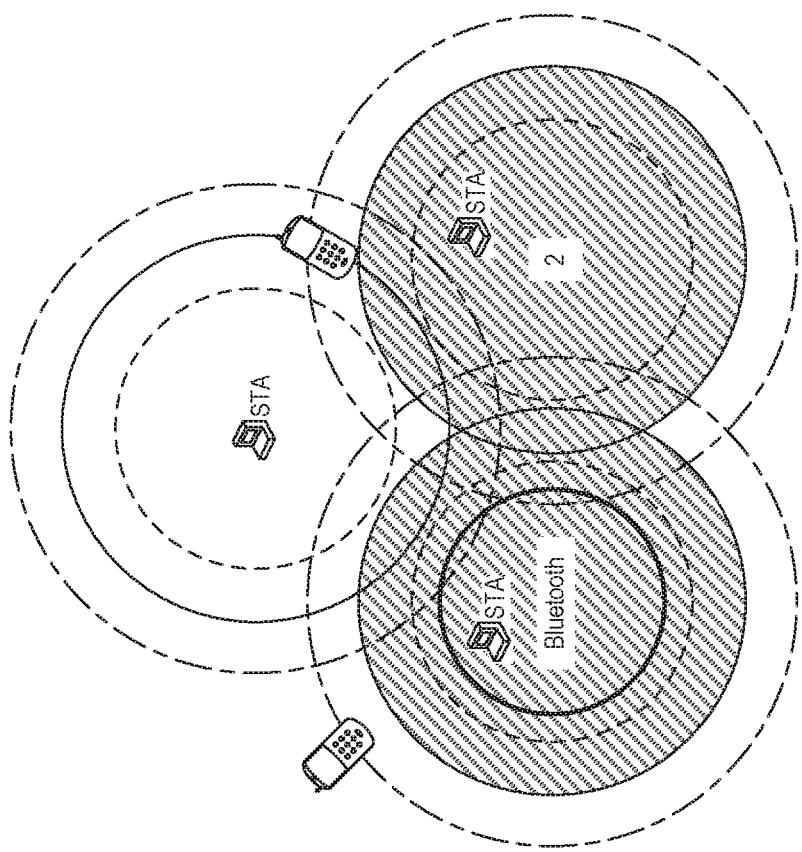
FIG. 10 shows an example of a detected intruder device, consistent with various embodiments.

The system can recognize the pattern of movement of devices which may belong to an intruder. Different patterns can be learned over different time of the day, for example between 1:00 am to 5:00 am, the pattern may be different than 4:00 pm to 8:00 pm. The pattern can be learned over time by seeing the RSSI of request that comes over Bluetooth or WiFi for unknown devices. The pattern can related to, e.g., RSSI, time of arrival, phase of arrival, etc. FIG. 10 shows an example of a detected intruder device.

The system can learn over time patterns of devices. For example, during the first few hours or few days, the system may be trained to MAC address of known device at home. The system may also learn the MAC address of neighbor device and other devices that are regularly within the range. After a few days the system may start sending alerts if MAC addresses of devices are suspicious.

Figure 11:
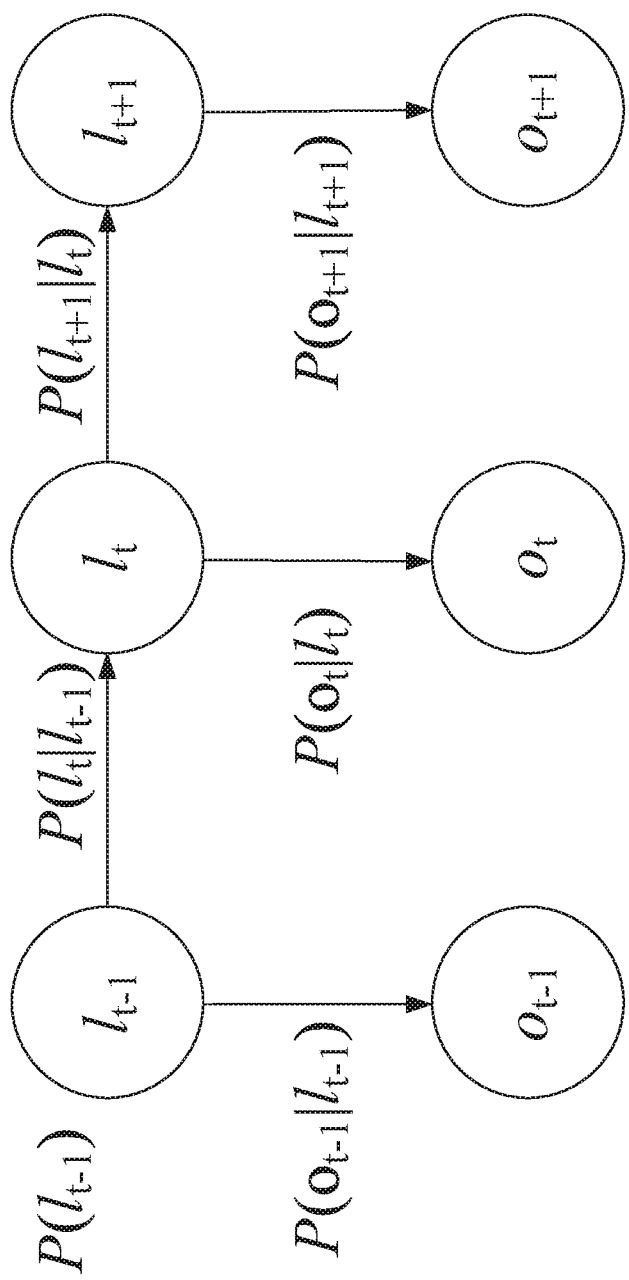
FIG. 11 shows an example of HMM for modeling device movement, consistent with various embodiments.

HMM may be used to model movement of unknown clients and see if they are at location they should not be. First order HMM may be used to model movement in and out of house or different locations. FIG. 11 shows an example of HMM for modeling device movement. It can be a different part of a property. Or it can be RSSI or time of arrival.

Figure 12:
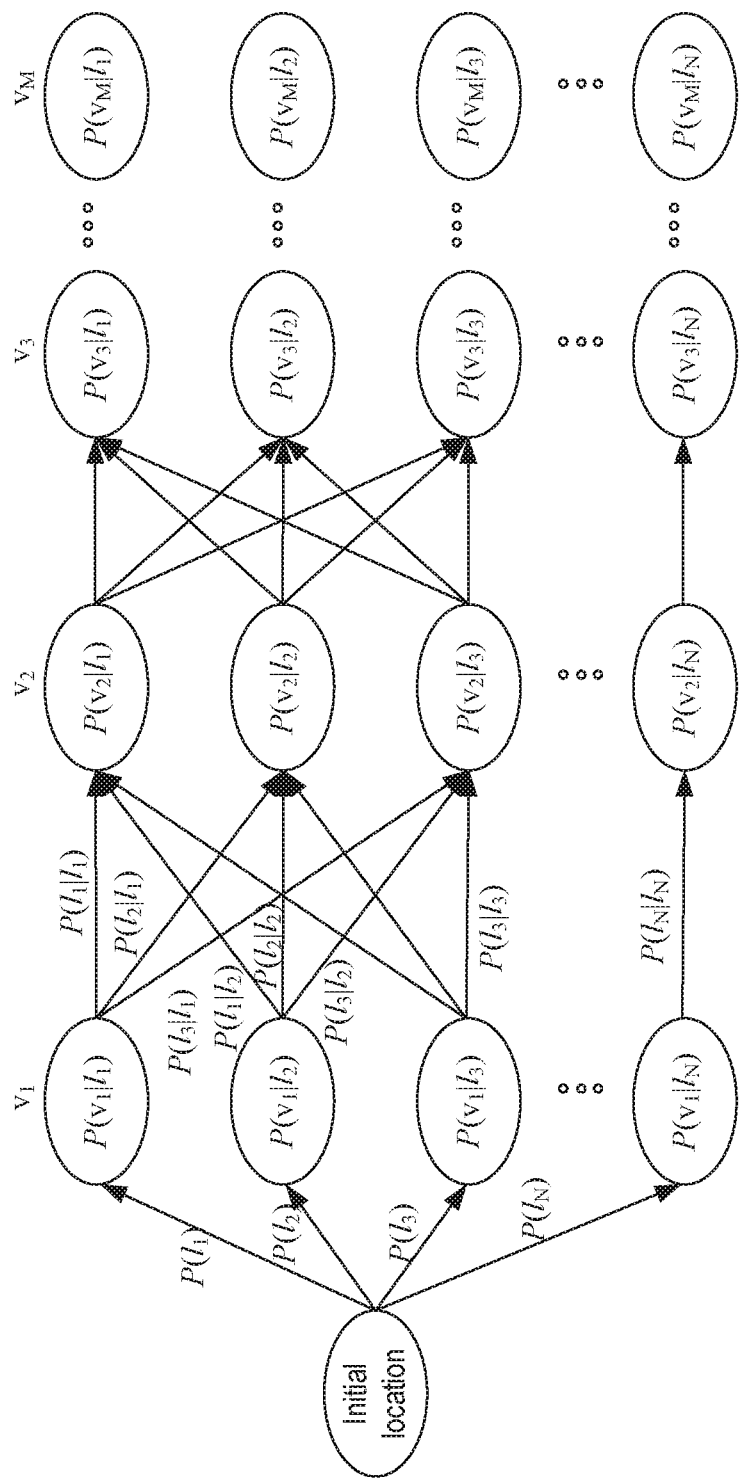
FIG. 12 shows an HMM model for coordination and time measurements, consistent with various embodiments.

The system can use Backhaul for coordination and time measurements. FIG. 12 shows an HMM model for coordination and time measurements. For example, given a set of RSSI variation trends, V=fv1, v2, . . . , vM and a settled HMM, the hidden location sequence L=f11, l2, . . . , l_N can be estimated by employing the Viterbi algorithm.

Figure 13:
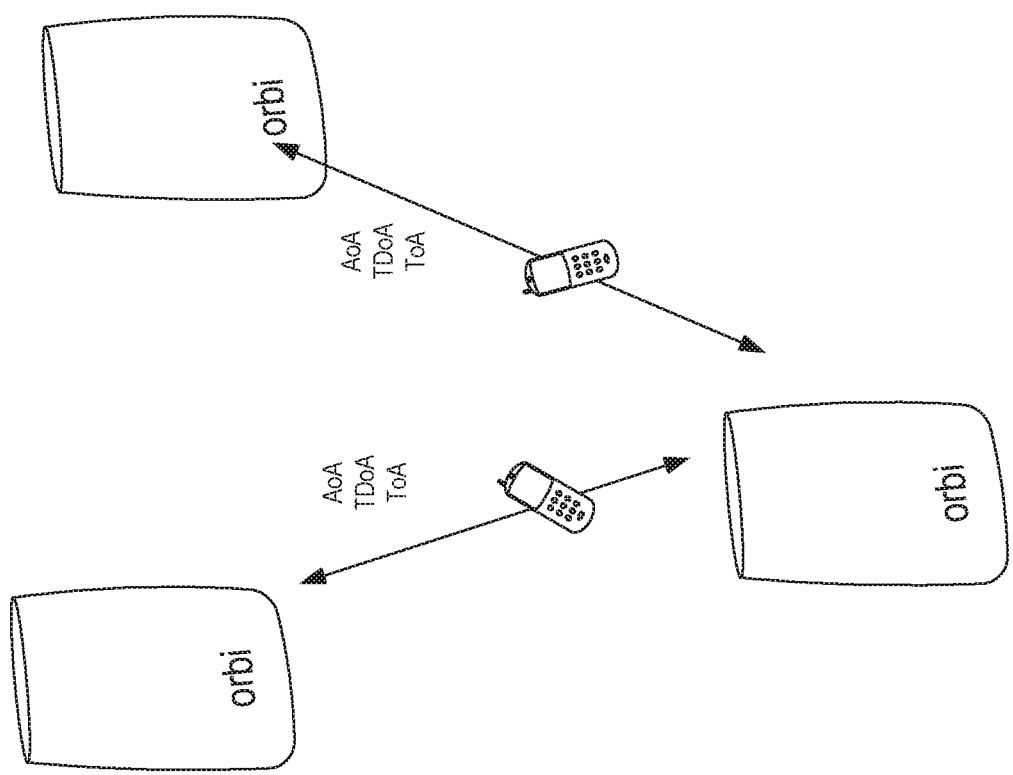
FIG. 13 shows intruder devices that are between the units of the system, consistent with various embodiments.

Data packets between units of the system may be used to detect an intruder device moving between the units. FIG. 13 shows intruder devices that are between the units of the system.

Deep Packet Inspection

The system can use Deep Packet Inspection (DPI) technology to analyze traffic from different devices and to differentiate them according to their payload. DPI is a form of computer network packet filtering that examines the data part and possibly the header of a packet as it passes an inspection point. In various embodiments, DPI searches for protocol non-compliance, viruses, spam, intrusions, or other defined criteria to decide whether the packet may pass or if the packet needs to be routed to a different destination or via a different route, such as via a backbone, or, for the purpose of collecting statistical information that functions at the Application layer of the Open Systems Interconnection (OSI) model.

Figure 14:
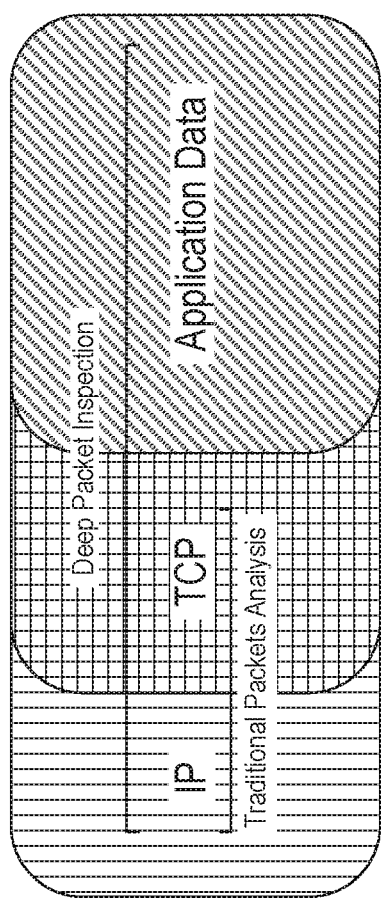
FIG. 14 shows architecture of Deep Packet Inspection (DPI) technology, consistent with various embodiments.

A DPI AP (unit) may look at traffic from a specific IP or MAC address, pick out the HTTP traffic, then drill even further down to capture traffic headed to and from a specific sever. FIG. 14 shows architecture of Deep Packet Inspection technology. For example, for application of email mail server, the system can reassemble e-mails as they are typed out by the user. DPI can feed back information on device type, length of connection, frequency of connection, etc. DPI can be used to detect timing critical applications, such as computer gaming or video chat. DPI can be used to detect the application and type of device sending data, the bandwidth or delay requirements for the application, etc. Data used by DPI, such as information that enables DPI detection of applications, devices, etc., may be updated using cloud infrastructure. For example, as new devices or applications are released, or current devices or applications are updated, a database containing application or device identification information used by DPI can be updated with information that enables identification of these new or updated applications or devices, such as device identifiers, device version identifiers, application identifiers, application version identifiers, among others.

The system can use DPI to classify IP traffic patterns and user behavior, and to act on that information. For example, the system can use DPI to improve network performance, to control WiFi congestion, to enhance quality of experience (QoE). The system can also use DPI to make system to be application-aware in scenarios such as roaming behavior being adjusted based on DPI, topology selection according to DPI, WiFi priority (e.g., EDCA (Enhanced Distributed Channel Access) parameter), power saving related behaviors.

The system can use DPI for band steering and AP steering. Some devices may be considered static devices in the home (which are not moving). For example, set-top-box (STB) can be characterized as static and unless sudden change in RSSI is made, we do not need to consider STB for roaming. Solar panel may be recognized as fixed device which does not require high bandwidth so it may be kept in 2.4 G and it does not need to be steered to 5 G or to another AP.

Figure 15:
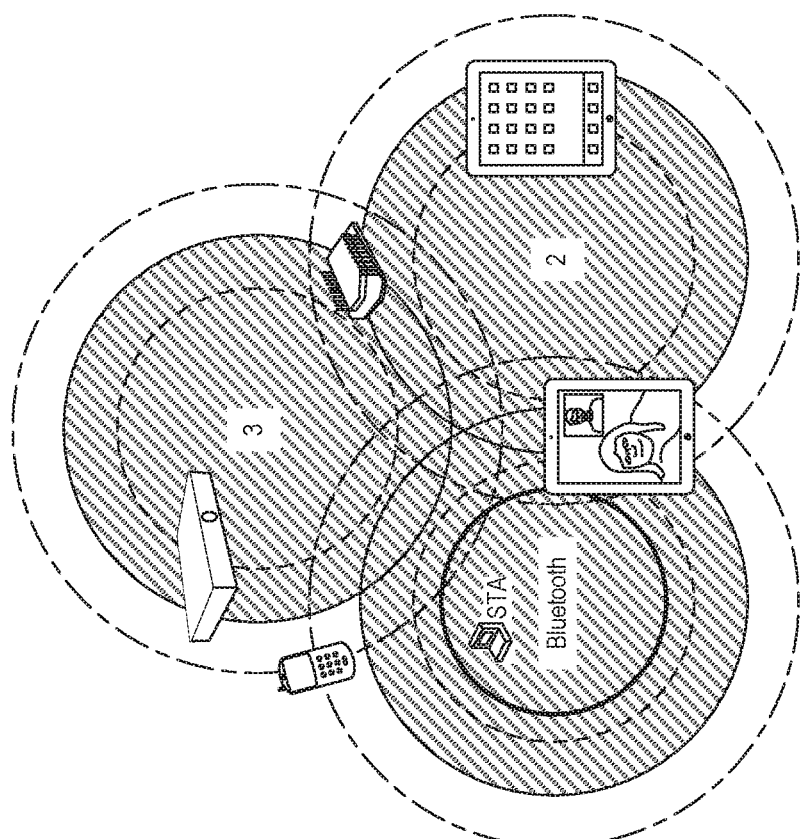
FIG. 15 shows devices that have different needs for power and data throughput, consistent with various embodiments.

The system can use DPI for power saving. For example, sensor device may be recognized as low power device and it may be kept on a band that gets less power. 2.4 GHz power amplifier are more energy-efficient than 5 GHz so client may be kept in 2.4 G even if it can be roamed to 5 G, especially if bandwidth requirement is relatively small. If the device traffic pattern change and high bandwidth traffic is initiated then the client may be steered to 5 G where packets may be sent in a faster way. Channel may be switched if another channel appears better for a power sensitive device. FIG. 15 shows devices that have different needs for power and data throughput.

Using DPI, the system can learn traffic over time. In other words, the type of traffic that is conveyed over a certain device may be learned during the time. The traffic type (voice, video, data, etc.), the amount of traffic (Mbps), and the combination will be learned. If a device has lot of heavy traffic (file download, Linux distribution), it should be put on a band on an AP (unit) that has the highest TPUT. A device which is primarily used for audio should be on a band which has least delay variation and packet loss. A unit may not be roamed at middle of a VoIP call as far as bandwidth, delay, and packet loss are at acceptable levels.

The system can also use DPI for topology and channel selection. For example, the traffic load may be measured in part of network and see how much airtime and data bytes are sent over the air. If the medium utilization goes more than X percentage (a threshold value), the units that has high medium utilization may be given higher priority in backhaul channel selection and front haul selection. The unit with higher traffic may roam some clients away to other units with less traffic.

Roaming

The system can conduct, e.g., 11k RSSI measurement when different APs (units) are on different channels for roaming purpose. However, 11k with multiple channel requests does not work with many clients. The system requests the client to conduct 11k response on current channel and conduct uplink/downlink calibration. After that, the system uses calibration to estimate downlink power based on uplink power. The system conducts 11k on candidate AP (unit), and infers 11k measurement based on last received packet on serving AP. The system compares the downlink measurement on other AP with estimated downlink power on current AP. Then the system makes decision to do roaming or not.

The system can conduct uplink/downlink calibration using 11k. When client supports 11k, the system performs the 11k measurement to see what the difference in power is. Later the system can use the information and does not need to ask for 11k measurement on serving AP if other APs are on other channels. The system asks for measurement report on current channel, receives the 11k report. The system compares the downlink power mentioned in 11k report to the RSSI of 11k report packet and comes up with a delta measurement. Several measurements may be done so the power difference can be averaged over multiple measurements so that the measurement is more accurate. The system can help rate control.

The system can in a monitor mode for legacy client with APs on same channel. With the monitor mode, other APs can go to sniffing mode to detect clients. A limited number of clients can be sniffed. If another AP is better by some margin, roaming can be triggered. Once another AP is deemed better, the system can use different roaming mechanism to conduct the roaming. APs are calibrated so that RSSI measurement is more accurate than client.

Figure 16:
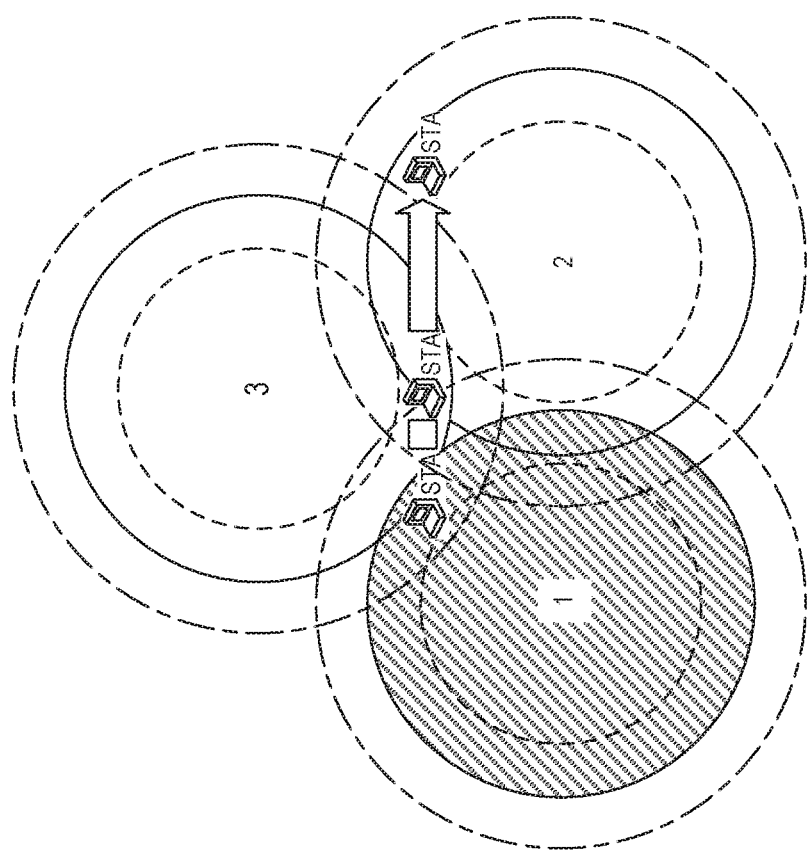
FIG. 16 shows that monitor mode can be triggered in middle mode, consistent with various embodiments.

The system can monitor client selection. Legacy clients with RSSI smaller than X can be monitor mode candidate. Clients with which 11k request fails can be candidate for roaming. Clients with which 11k measurements are not accurate can be used. When 11k measurement has a delay that is larger than a desired level, the client may be candidate for monitor mode. Monitor mode can be used to calibrate transmit and receive power difference. FIG. 16 shows that monitor mode can be triggered in middle mode.

The system monitor mode can use fast channel switch. AP needs to hop to another channel to make a measurement. Coordination needs to be done for AP so it can hop to the other channel and hop back. AP needs to make sure when it jumps to other channel, the current client does not treat the AP as disconnected.

The monitor mode can be on different channels. Channel switch coordination can be done over backhaul. The system asks the non-serving AP to come to channel of serving AP, and does a measurement and then goes back to current channel and sends measurement data back to serving AP over backhaul. The AP will send a control packet on its channel indicating it is offline for a time period. In this case the uplink RSSI is measured and compared between different AP on different channel.

Indoor Object Tracking

Indoor positioning is one of the challenging problems. For areas where there is a line-of-sight (LOS) to satellites, the GNSS (Global Navigation Satellite System) provides a good estimate (within a few meters) of a mobile user (MU) location. Signals coming from satellites cannot be currently used in most indoor environments due to the fact that they are not strong enough to penetrate most materials. Infrastructures which offer strong signals indoor should be used for indoor localization or tracking such as 802.11, BLE, Bluetooth.

Applications for indoor localization/tracking includes, pet tracking, asset tracking (e.g. phone tracking, shopping mall asset tracking, etc.), indoor navigation, asset tracking and troubleshooting, getting locations of units that have issues, getting locations of WiFi device that have issues, getting locations of Bluetooth devices that have issues, retail analytics, tracking people movement by tracking their cell phones, measuring how long people stay in some locations, elder location, valuables tracking, burglar detection, etc.

The system can use the localization techniques available on WiFi and Bluetooth. The system can use backhaul to do the coordination between units that is required to come up with accurate location. The system can use Bluetooth on several units as opposed to only main unit which helps locating a low range Bluetooth device. The system can use Bluetooth triangulation, WiFi triangulation, or a combination thereof. The system can use GPS from phone APP to help when possible. 60 GHz may also be used for better accuracy.

Figure 17:
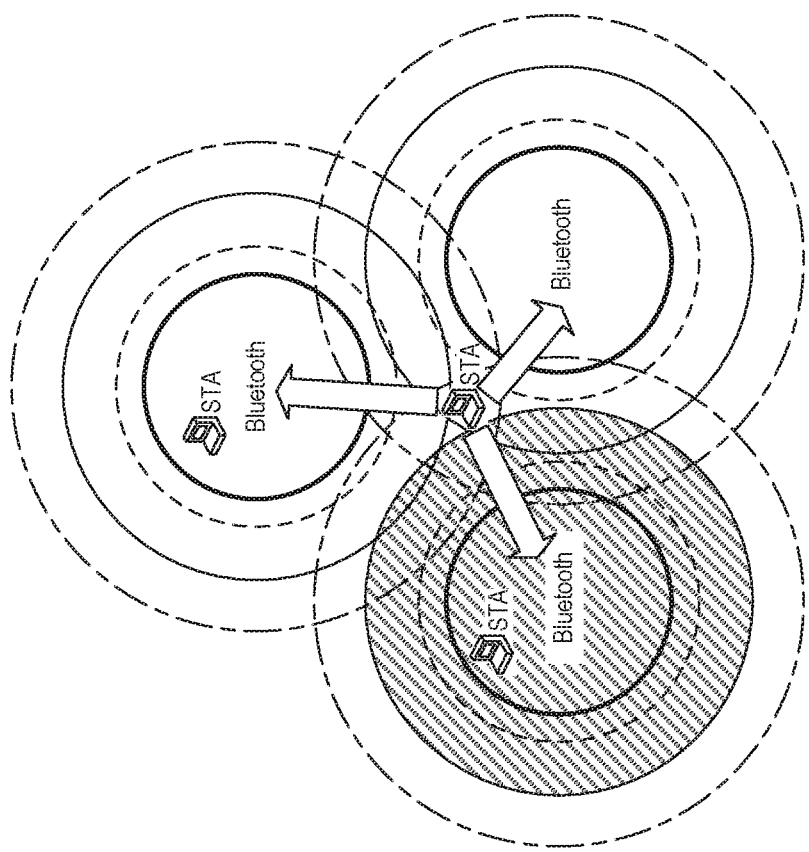
FIG. 17 shows time of arrival and amplitude measurements for tracking, consistent with various embodiments.
Figure 18:
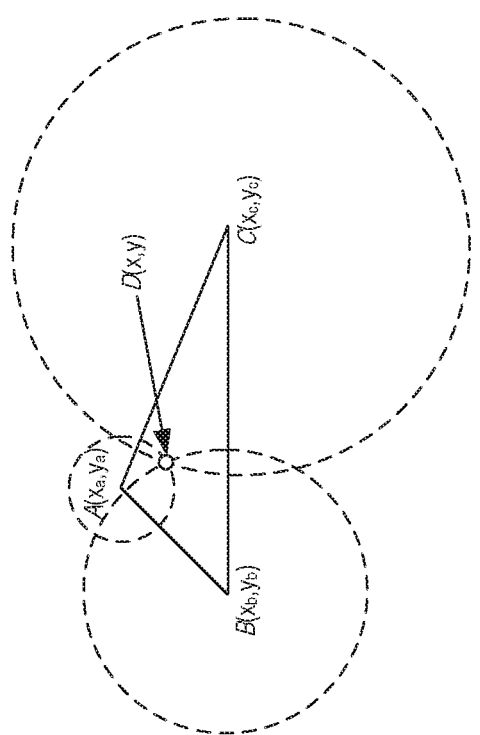
FIG. 18 shows a triangulation concept using WiFi or BLE (Bluetooth low energy), consistent with various embodiments.

The system can use various types of measurement for tracking purposes, such as Time of Arrival (TOA), Time Difference of Arrival (TDOA), Angle of Arrival (AOA), and Received Signal Strength (RSS). Instead of TOA, round-trip time (RTT) may be used to avoid synchronization need. LOS may not be available, the system can use a linear regression with mean square error as the model which best relates the statistical estimator of the RTT to the actual distance between two wireless units in LOS or NLOS. The statistical estimator that best fits that model is found with the aim of improving the accuracy achieved in distance estimates. Moreover, hybrid location techniques as TDOA and AOA, TOA and RSS or DOA and RSS can be exploited to improve the accuracy. FIG. 17 shows time of arrival and amplitude measurements for tracking. FIG. 18 shows a triangulation concept using WiFi or BLE.

Figure 19:
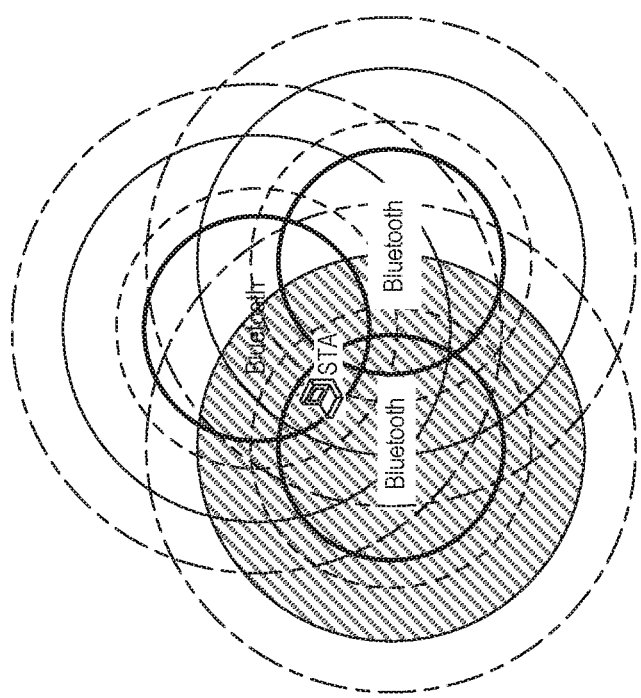
FIG. 19 shows client within ranges of multiple Bluetooth while units of the system only communicate over WiFi, consistent with various embodiments.

The system can also use Bluetooth for proximity estimation. For example, if a low power Bluetooth device is intended to be tracked, the system can identify a unit closest to the Bluetooth device if it is reachable from only one of the devices. Bluetooth GATT profile may be used for proximity detection. Propagation time of electromagnetic waves may be used on Bluetooth to do the relative location measurement to a unit of the system if Bluetooth can be heard from multiple devices. Relative position of units of the system in the house and the house plot may be entered by the user and then the positions are shown on top of the house plot to the user. The position can be shown on a web page or phone app. FIG. 19 shows client within ranges of multiple Bluetooth while units of the system only communicate over WiFi.

Figure 20:
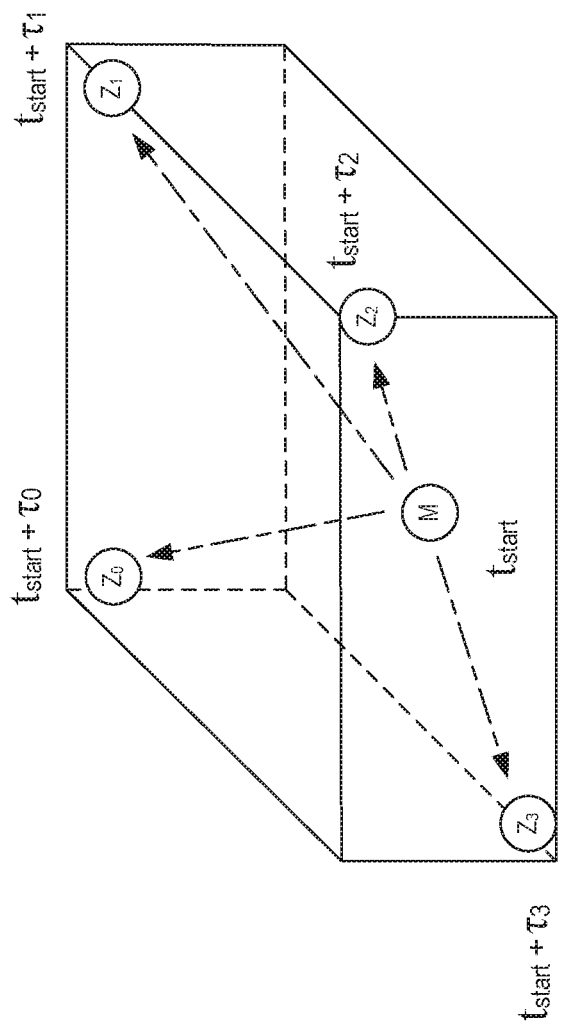
FIG. 20 shows a Bluetooth localization using time of arrival, consistent with various embodiments.

The system can conduct Bluetooth localization using time of arrival. FIG. 20 shows a Bluetooth localization using time of arrival. Synchronization between base station and satellite units may be performed in order to measure relative delay. Dedicated hardware for phase measurement can be installed on Bluetooth device or on units of the system.

The system can use backhaul for coordination and time measurement. In other words, the management of time synchronization of Bluetooth may be performed over backhaul. The amplitude may also be used for measurement. All information will be communicate to one or more of the units and relative location will be calculated and communicate to the user.

The system can also use WiFi localization. A trigger frame may be sent from AP to client. Client may measure relative delay from all APs. A trigger frame may be sent from AP to client and client may send another frame back to AP to calculate RTT. Trigger frame may be sent from client to AP as well. Relative delay or RTT can be measured from client side as well.

Figure 21:
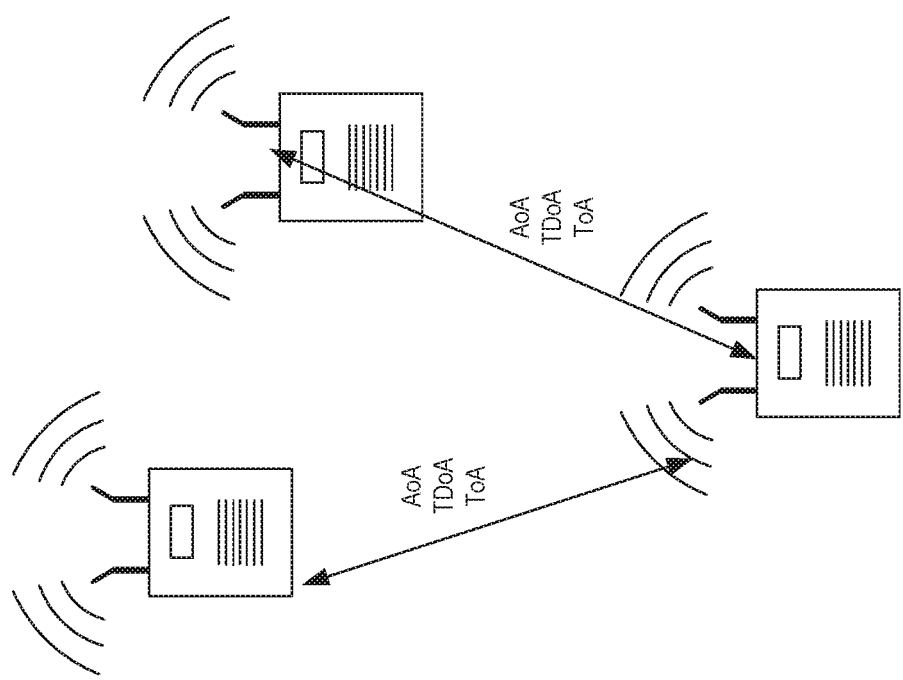
FIG. 21 shows that location of one unit of the system can be detected from known locations of other units of the system, consistent with various embodiments.

FIG. 21 shows that location of one unit of the system can be detected from known locations of other units of the system.

Figure 22:
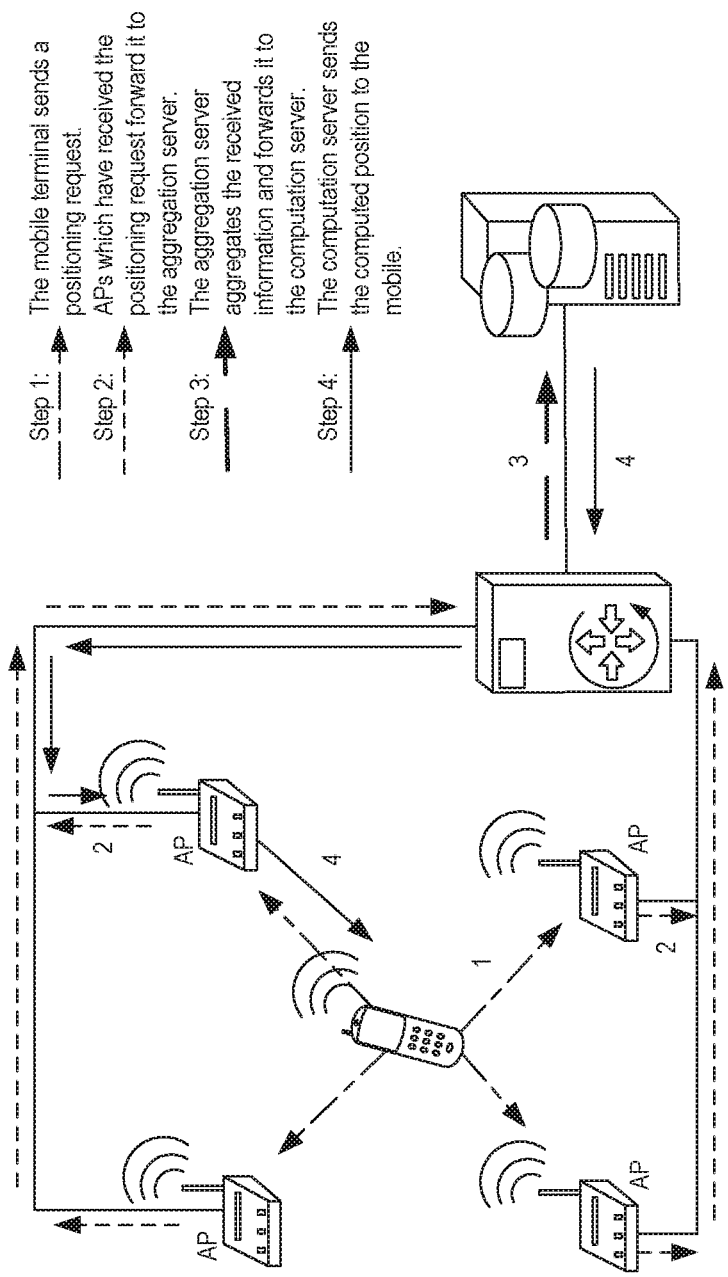
FIG. 22 shows a device is used for locating itself, consistent with various embodiments.

The system can use a device to locate itself. The management of time synchronization of Bluetooth may be performed over backhaul. The data aggregation may be done on base unit. Communication can be done on a unit of the system or a cloud server which the unit is communicating with. FIG. 22 shows a device is used for locating itself.

An AP (unit) or a cloud server can initiate the estimation. For example, an AP may trigger the location detection. The AP may send trigger frames to client or it may ask client to send trigger to AP. Alternatively, the cloud server may be used to initiate the location estimation. A phone app may be used to initiate the location estimation using Bluetooth or using cloud connection.

The system can use different protocols for localization/tracking. There are various protocols for request sent by an AP to a client to conduct a set of timing measurements with other access points. For example, 802.11k may be used standardized RSSI measurements if RSSI is used for localization. 802.11u may be used addresses requirement for location awareness for E911. 802.11v provides formats for sending RSSI+geolocation (from GPS/aGPS) around the network.

Figure 23:
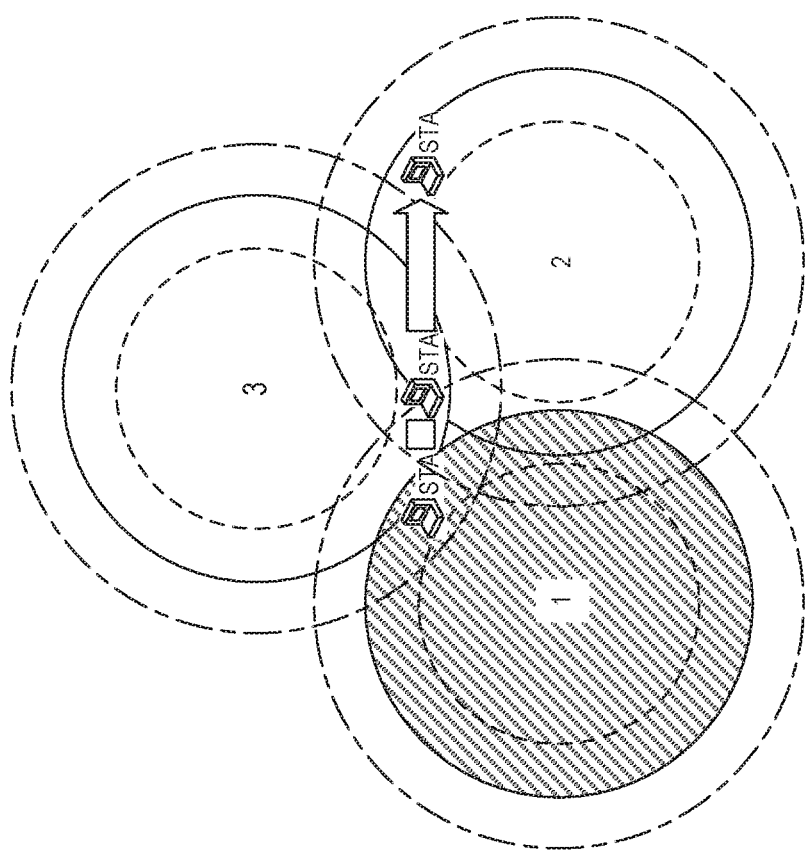
FIG. 23 shows that locations can be tracked based on initial GPS locations, consistent with various embodiments.

Fine Timing Measurement (FTM) protocol under IEEE 802.11 may also be used. For example, client can request an AP to share its location (e.g. in latitude/longitude or as a civic address). AP can share information about their "height," e.g. floor number or "height above floor" with client devices. AP can share a set of AP locations in the form of a "neighbor report," which can significantly enhance the efficiency of the data exchange. AP can send a request to a client to conduct a set of timing measurements with other access points. AP can send a request to ask a client to report its location. A client can send a request to ask an AP to share a URI or Domain Name where additional assistance or maps and mapping data can be obtained. A client and an AP can negotiate to schedule timing measurements at pre-arranged times and use timing measure to location estimation. Those measurements can be combined with GPS locations. FIG. 23 shows that locations can be tracked based on initial GPS locations.

In some other embodiments, the system can also track locations based on IP addresses or known SSID (Service Set Identifier).

Figure 26:
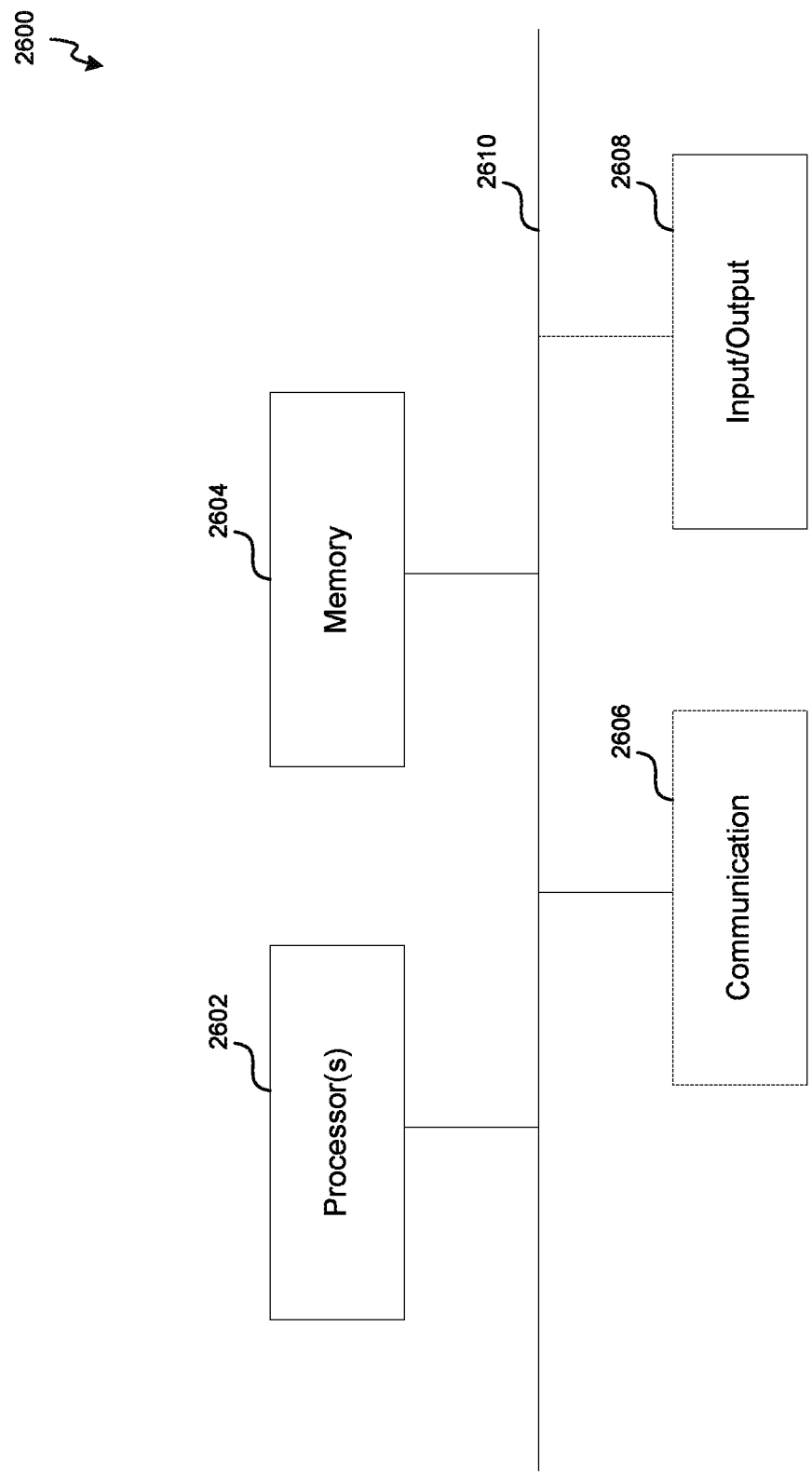
FIG. 26 shows a block diagram illustrating an example of a processing system in which at least some operations described herein can be implemented, consistent with various embodiments.

FIG. 26 is a high-level block diagram illustrating an example of a processing system in which at least some operations described herein can be implemented, consistent with various embodiments. The processing system can be processing device 2600, which represents a system that can run any of the methods/algorithms described above. For example, processing device 2600 can be any of devices STA 410, STA 420, STA 710, or wireless networking device 2700, among others. A system may include two or more processing devices such as represented in FIG. 26, which may be coupled to each other via a network or multiple networks. A network can be referred to as a communication network.

In the illustrated embodiment, the processing device 2600 includes one or more processors 2602, memory 2604, a communication device 2606, and one or more input/output (I/O) devices 2608, all coupled to each other through an interconnect 2610. The interconnect 2610 may be or include one or more conductive traces, buses, point-to-point connections, controllers, adapters and/or other conventional connection devices. Each of the processors 2602 may be or include, for example, one or more general-purpose programmable microprocessors or microprocessor cores, microcontrollers, application specific integrated circuits (ASICs), programmable gate arrays, or the like, or a combination of such devices. The processor(s) 2602 control the overall operation of the processing device 2600. Memory 2604 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 2604 may store data and instructions that configure the processor(s) 2602 to execute operations in accordance with the techniques described above. The communication device 2606 may be or include, for example, an Ethernet adapter, cable modem, Wi-Fi adapter, cellular transceiver, Bluetooth transceiver, or the like, or a combination thereof. Depending on the specific nature and purpose of the processing device 2600, the I/O devices 2608 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 2600, any of STA 410, STA 420, STA 710, wireless networking device 2700, etc., can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 27:
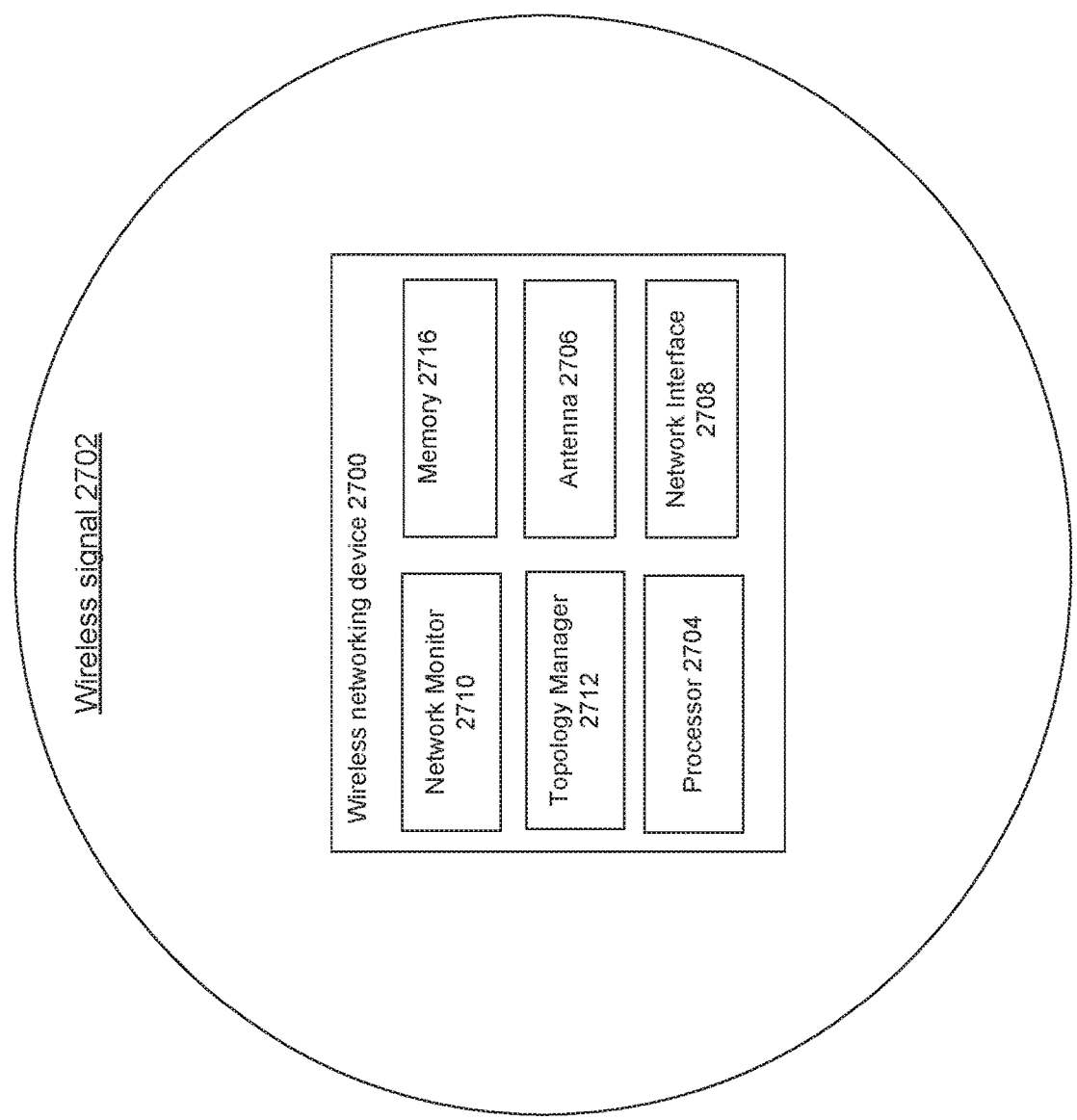
FIG. 27 is a system block diagram illustrating an access point in which at least some operations described herein can be implemented, consistent with various embodiments.

FIG. 27 is a system block diagram of an wireless networking device 2700 according to various embodiments. Wireless networking device 2700, which can be an access point, a router, a satellite device, etc., can further be processing device 2600 of FIG. 26. Wireless networking device 2700 transmits a wireless signal 2702 which clients use to connect to the wireless networking device 2700 and there through, to connect to other wireless networking devices or to the Internet. Wireless networking device 2700 is processor based, and therefore includes a processor 2704, which can be the same as processor 2602. Further included are at least one antenna 2706 transmitting and receiving wireless communications. In some embodiments, wireless networking device 2700 includes network interface 2708 for communicating with a wired network, such as a wired network with access to the Internet. Network interface 2708 and antenna 2706 can be part of communication device 2606.

Wireless networking device 2700 additionally communicates with neighboring wireless networking devices, such as via a backhaul channel. Each wireless networking device may be constructed similarly and may have an organized topology based on the local environment.

Wireless networking device 2700 includes additional modules: a network monitor 2710, and a topology module 2712, among others. Network monitor 2710 is a module designed to determine a network-related parameter, such as by collecting data from a client device or other wireless networking device. Topology module 2712 is a module designed to change a topology of a network, such as by changing a connection of a particular wireless device.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

The invention claimed is:

1. A method for utilizing a backhaul channel to control channel usage for a plurality of communication channels of a Wi-Fi network, the method comprising:
  identifying, by an access point (AP) Wi-Fi device, the backhaul channel to use as a primary channel for communication between the AP Wi-Fi device and a satellite Wi-Fi device based on a determination that the backhaul channel is configured for higher bandwidth communication than a first communication channel of the plurality of communication channels, wherein the AP Wi-Fi device is a router device that is configured to forward data packets between communication networks, that is configured to connect to a wired network, and that is configured to connect with other Wi-Fi devices via the plurality of communication channels,
  identifying, by the AP Wi-Fi device, the first communication channel as a primary channel for communication between a client Wi-Fi device and any of the AP Wi-Fi device or the satellite Wi-Fi device;
  determining, by the AP Wi-Fi device, first interference characteristics of each channel of the plurality of communication channels, and, by the satellite Wi-Fi device, second interference characteristics of each channel of the plurality of communication channels;
  sending, via the backhaul channel, by the satellite Wi-Fi device, to the AP Wi-Fi device, the second interference characteristics;
  determining, by the AP Wi-Fi device, to use a second communication channel of the plurality of communication channels for communication from the AP Wi-Fi device to the client Wi-Fi device based on the first and the second interference characteristics; and
  sending a message, from the AP Wi-Fi device, to the client Wi-Fi device, that causes the client Wi-Fi device to switch from the first communication channel to the second communication channel to facilitate communication between the AP Wi-Fi device and the client Wi-Fi device.

2. The method of claim 1,
  wherein the satellite Wi-Fi device is configured to relay data between the AP Wi-Fi device and the client Wi-Fi device via any of the plurality of communication channels,
  wherein the plurality of communication channels include a fast communication channel and a slow communication channel,
  wherein the backhaul channel is the fast communication channel,
  wherein the fast communication channel has higher bandwidth communication capabilities than the slow communication channel, and
  wherein the router device is a layer 2 bridge device or a layer 3 gateway device.

3. The method of claim 1, further comprising:
  categorizing a type of interference detected on the second communication channel, wherein the determination to use the second communication channel is based on the categorization of the type of interference.

4. The method of claim 3, wherein the type of interference is electromagnetic interference generated by one of a baby monitor, a cordless phone, a Bluetooth device, a car alarm, a microwave oven, a video device, or a ZigBee device.

5. The method of claim 3, wherein the categorization of the type of interference detected indicates that the interference detected will continue for longer than a predetermined amount of time, and wherein the determination to use the second communication channel is based in the indication that the interference detected will continue for longer than the predetermined amount of time.

6. The method of claim 1, wherein determining to use the second communication channel includes:
  sending, by the AP Wi-Fi device, to a cloud-based server, data that indicates the first and the second interference characteristics; and
  receiving, from the cloud-based server, by the AP Wi-Fi device, selection data that indicates that the cloud-based server made a determination, based on an analysis of the first and the second interference characteristics, that the AP Wi-Fi device should use the second communication channel, wherein the determining, by the AP Wi-Fi device, to use the second communication channel is based on the selection data;
  wherein the selection data was generated after the cloud-based server detected a certain type of interference based on the first or the second interference, and after the cloud-based server categorized the certain type of interference, and wherein the selection data indicates that the cloud-based server made the determination by indicating that the cloud-based server categorized the interference in a particular category.

7. A method comprising:
identifying, by an access point (AP) Wi-Fi device or a satellite Wi-Fi device, a backhaul channel to use as a primary channel for communication between the AP Wi-Fi device and the satellite Wi-Fi device based on a determination that the backhaul channel is configured for higher bandwidth communication than a first communication channel of a plurality of communication channels;
identifying, by the AP Wi-Fi device or the satellite Wi-Fi device, the first communication channel as a primary channel for communication between a client Wi-Fi device and any of the AP Wi-Fi device or the satellite Wi-Fi device;
determining, by the AP Wi-Fi device, first interference characteristics of a subset of the plurality of communication channels;
determining, by the satellite Wi-Fi device, second interference characteristics of the subset of the plurality of communication channels;
determining, by a first device of the AP Wi-Fi device or the satellite Wi-Fi device, to use a second communication channel of the plurality of communication channels for communication between the first device and the client Wi-Fi device based on data received via the backhaul channel that indicates the first or the second interference characteristics; and
sending a message, by the first device, to the client Wi-Fi device, that causes the client Wi-Fi device to switch from the first communication channel to the second communication channel to facilitate communication with the first device.

8. The method of claim 7, further comprising:
sending a message, by the AP Wi-Fi device, to the satellite Wi-Fi device, via the backhaul channel, that includes data that indicates a coordination of usage, by the AP Wi-Fi device and the satellite Wi-Fi device, of the plurality of communication channels.

9. The method of claim 7, further comprising:
when the first device is the AP Wi-Fi device, sending, by the AP Wi-Fi device, to a cloud-based server, the data that indicates the first and the second interference characteristics; and
receiving, from the cloud-based server, by the AP Wi-Fi device, selection data that indicates that the cloud-based server made a determination, based on an analysis of the first and the second interference characteristics, that the first device should use the second communication channel, wherein the determining, by the first device, to use the second communication channel is based on the selection data.

10. The method of claim 9, further comprising:
receiving, from the cloud-based server, data that indicates a coordination of usage, by the AP Wi-Fi device and the satellite Wi-Fi device, of the plurality of communication channels, wherein the selection data is the data that indicates the coordination of usage.

11. The method of claim 9, wherein the selection data was generated after the cloud-based server detected a certain type of interference based on the first or the second interference, and after the cloud-based server categorized the certain type of interference, and wherein the selection data indicates that the cloud-based server made the determination by indicating that the cloud-based server categorized the interference in a particular category.

12. The method of claim 9, wherein the cloud-based server collected the data that indicates the first and the second interference characteristics over a predetermined period of time to create historical interference characteristics, and wherein the determination that the first device should use the second communication channel is based on an analysis of the historical interference characteristics.

13. The method of claim 7, wherein the subset of the plurality of communication channels is all of the plurality of communication channels.

14. The method of claim 7, wherein the first device is the AP Wi-Fi device, the method further comprising:
receiving, by the AP Wi-Fi device, from the satellite Wi-Fi device, data that indicates that the second communication channel has less interference than other communication channels, wherein the determining, by the first device, to use the second communication channel is based on the data from the satellite Wi-Fi device.

15. The method of claim 7,
wherein the AP Wi-Fi device is a router device that is configured to forward data packets between communication networks, that is configured to connect to a wired network, and that is configured to communicate with other Wi-Fi devices via the plurality of communication channels,
wherein the satellite Wi-Fi device is configured to relay data between the AP Wi-Fi device and the client Wi-Fi device via any of the plurality of communication channels,
wherein the plurality of communication channels include a fast communication channel and a slow communication channel, and
wherein the backhaul channel is the fast communication channel, and
wherein the fast communication channel has higher bandwidth communication capabilities than the slow communication channel.

16. The method of claim 15, wherein the fast communication channel is a 5 Ghz channel, and wherein the slow communication channel is a 2.4 Ghz channel.

17. The method of claim 15, wherein the fast communication channel is a 60 GHz channel or a millimeter wave channel, and wherein the slow communication channel is a 5Ghz channel or a 2.4 Ghz channel.

18. The method of claim 15, wherein the data received via the backhaul channel indicates that the fast communication channel has more interference than the slow communication channel, wherein the second communication channel is the slow communication channel, and wherein the determination to use the second communication channel is based on the data that indicates that the fast communication channel has more interference than the slow communication channel.

19. The method of claim 7, wherein the backhaul channel is a faster communication channel, wherein the second communication channel is a slower communication channel, and wherein the faster communication channel has higher bandwidth communication capabilities that the slower communication channel.

20. An Access Point (AP) Wi-Fi device comprising:
a processor;
a wireless interface coupled to the processor; and
a memory coupled to the processor and storing instructions which, when executed by the processor, cause the AP Wi-Fi device to perform operations including:

identifying a backhaul channel to use as a primary channel for communication between the AP Wi-Fi device and a satellite Wi-Fi device based on a determination that the backhaul channel is configured for higher bandwidth communication than a first communication channel of a plurality of communication channels;

identifying the first communication channel as a primary channel for communication between a client Wi-Fi device and the AP Wi-Fi device;

determining interference characteristics of a subset of the plurality of communication channels;

receiving, via the wireless interface, from the satellite Wi-Fi device, data transmitted via the backhaul channel that indicates interference characteristics of the subset of the plurality of communication channels;

determining to use a second communication channel of the plurality of communication channels for communication between the AP Wi-Fi device and the client Wi-Fi device based on the data received over the backhaul channel, and based on the determined interference characteristics of the subset of the plurality of communication channels; and sending a message, via the wireless interface, to the client Wi-Fi device, that causes the client Wi-Fi device to switch from the first communication channel to the second communication channel to facilitate communication with the AP Wi-Fi device.

21. The AP Wi-Fi device of claim 20, wherein the operations further include:

sending the interference characteristics to a cloud-based server to enable the cloud-based server to make a determination as to which channel to use for communication between the AP Wi-Fi device and the client Wi-Fi device, wherein the determination to use the second communication channel is based on the determination as to which channel to use for communication between the AP Wi-Fi device and the client Wi-Fi device.

22. The AP Wi-Fi device of claim 20, wherein the operations further include:

categorizing a type of interference detected on the second communication channel, wherein the determination to use the second communication channel is based on the categorization of the type of interference.

\* \* \* \* \*